US009108344B2

(12) United States Patent
Yamaguchi et al.

(10) Patent No.: US 9,108,344 B2
(45) Date of Patent: *Aug. 18, 2015

(54) MOLDED ARTICLE TRANSFERRING DEVICE AND BLOW MOLDING DEVICE

(71) Applicant: NISSEI ASB MACHINE CO., LTD., Nagano (JP)

(72) Inventors: Masaki Yamaguchi, Nagano (JP); Masatoshi Ando, Komoro (JP); Shuichi Ogihara, Saku (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,855

(22) Filed: Jun. 23, 2014

(65) Prior Publication Data

US 2014/0302191 A1 Oct. 9, 2014

Related U.S. Application Data

(63) Continuation of application No. 13/867,513, filed on Apr. 22, 2013, now Pat. No. 8,777,606, which is a continuation of application No. PCT/JP2011/074273, filed on Oct. 21, 2011.

(30) Foreign Application Priority Data

Oct. 25, 2010 (JP) ................................ 2010-238199

(51) Int. Cl.

*B29C 49/06* (2006.01)
*B65G 17/12* (2006.01)

(Continued)

(52) U.S. Cl.

CPC ............... *B29C 49/064* (2013.01); *B29C 49/06* (2013.01); *B29C 49/4205* (2013.01); *B29C 49/4823* (2013.01); *B29C 49/6409* (2013.01);

(Continued)

(58) Field of Classification Search

CPC .. B29C 49/06; B29C 49/064; B29C 49/4205; B29C 49/6409; B29C 49/6427; B29C 49/6472; B65G 17/12

USPC ......................................... 425/526, 533, 534

See application file for complete search history.

(56) References Cited

U.S. PATENT DOCUMENTS 3,984,513 A 10/1976 Mulraney
5,744,176 A 4/1998 Takada et al.

(Continued)

FOREIGN PATENT DOCUMENTS

CN 1200067 A 11/1998
DE WO2007-131701 A2 11/2007

(Continued)

*Primary Examiner* — Robert B Davis

(74) *Attorney, Agent, or Firm* — David L. Hoffman; Hoffman Patent Group

(57) ABSTRACT

In an embodiment, an injection stretch blow molding device includes an injection molding section that produces N (N is an integer equal to or larger 2) preforms by injection molding, a cooling section that subjects the N preforms transferred from the injection molding section to forced cooling, a heating section that continuously transfers and heats the N cooled preforms, and a blow molding section that subjects the N heated preforms to stretch blow molding in n (n is an integer equal to or larger than 2) operations, the blow molding section simultaneously stretch blow molding M (M=N/n, M is a natural number) preforms among the N preforms into M containers.

8 Claims, 24 Drawing Sheets

325 324 322 30A 310 328A 30A 30 323 1 10 40 328B 321 100 110 402 400 401 60 326 329 312 300 327 328 C 122 120 D1 D2

(51) Int. Cl.

| | |
|---|---|
| ***B29C 49/42*** | (2006.01) |
| ***B29C 49/64*** | (2006.01) |
| ***B29C 49/48*** | (2006.01) |
| *B29C 49/12* | (2006.01) |

(52) U.S. Cl.

CPC ................ *B65G17/12* (2013.01); *B29C 49/12* (2013.01); *B29C 49/6427* (2013.01)

(56) References Cited

U.S. PATENT DOCUMENTS

| | | | | |
|---|---|---|---|---|
| 5,753,279 | A | 5/1998 | Takada et al. | |
| 5,869,110 | A | 2/1999 | Ogihara | |
| 5,972,255 | A | 10/1999 | Takada et al. | |
| 6,019,933 | A | 2/2000 | Takada et al. | |
| 6,109,907 | A | 8/2000 | Takada et al. | |
| 6,156,258 | A | 12/2000 | Takada et al. | |
| 6,247,916 | B1 | 6/2001 | Takada et al. | |
| 6,451,243 | B1 | 9/2002 | Takada et al. | |
| 6,457,967 | B1 | 10/2002 | Suzuki et al. | |
| 6,582,217 | B1 | 6/2003 | Achhammer | |
| 6,607,375 | B1 | 8/2003 | Takada et al. | |
| 6,730,260 | B2 | 5/2004 | Vardin et al. | |
| 7,727,454 | B2 | 6/2010 | Freire-Diaz et al. | |
| 8,777,606 | B2 * | 7/2014 | Yamaguchi et al. | 425/526 |
| 2001/0031291 | A1 | 10/2001 | Takada et al. | |
| 2003/0168782 | A1 | 9/2003 | Suzuki | |
| 2007/0098837 | A1 | 5/2007 | Benich | |
| 2007/0224307 | A1 | 9/2007 | Zoppas et al. | |
| 2010/0052224 | A1 | 3/2010 | Humele et al. | |
| 2013/0236589 | A1 | 9/2013 | Yamaguchi et al. | |

FOREIGN PATENT DOCUMENTS

| | | | |
|---|---|---|---|
| EP | 1410894 | | 4/2004 |
| IT | WO2005-037525 | A1 | 4/2005 |
| JP | B-53-022096 | | 7/1978 |
| JP | B-0002954858 | | 5/1996 |
| JP | A-11-277616 | | 10/1999 |
| JP | A-11349122 | | 12/1999 |
| JP | A-2000-117821 | | 4/2000 |
| JP | A-2007-044992 | | 2/2007 |
| JP | A-2007-508164 | | 4/2007 |
| JP | A-2007-276327 | | 10/2007 |
| JP | A-2009-536589 | | 10/2009 |
| KR | 2006-0132613 | A | 12/2006 |
| RU | 2123934 | C1 | 12/1998 |
| RU | 2000105907 | A | 10/2002 |
| WO | WO 03008176 | | 1/2003 |

* cited by examiner 110
100
10
1
323
328B
30
30A
321
328A
310
30A
322
324
325
326
329
300
312
327
328
C
122
120
D1
D2
40
402
401
60
400

D1
D2
10
100
104
122
120
106
110
102
510
B
50
20
A
520
206
204
F
D
40
60

210A
210B
210C
211
212

MOLDED ARTICLE TRANSFERRING DEVICE AND BLOW MOLDING DEVICE

CROSS REFERENCE TO RELATED APPLICATION(S)

This application is a continuation of U.S. patent application Ser. No. 13/867,513, filed on Apr. 22, 2013, and which is a continuation of International Patent Application No. PCT/JP2011/074273, having an international filing date of Oct. 21, 2011, which designated the United States and which claims priority from Japanese Patent Application No. 2010-238199 filed on Oct. 25, 2010, the entirety of all of which are incorporated herein by reference.

BACKGROUND OF THE INVENTION

1. Field of the Invention

The present invention relates to an injection stretch blow molding device and a molded article heating device.

2. Description of the Related Art

A blow molding system may utilize a 2-stage (cold parison) method or a 1-stage (hot parison) method.

According to the 2-stage (cold parison) method, a blow molding system is provided separately from a preform injection molding system, and the preform injection molding operation and the blow molding operation are implemented off-line. A preform (parison) that has been produced by injection molding using the injection molding system, and allowed to cool to room temperature (i.e., natural cooling) is supplied to the blow molding system. The preform supplied from the injection molding system is heated to the optimum blow temperature using a heating section, and subjected to blow molding using a blow molding section to obtain a container. The preforms are intermittently or continuously transferred in the heating section, and at least one preform is intermittently transferred from the heating section to the blow molding section. The blow molding section subjects at least one preform to blow molding to obtain at least one container (see U.S. Pat. No. 7,727,454, Japanese Patent Application Publication No. JP-A-2000-117821 and Japanese Patent Application Publication No. JP-A-2007-276327).

According to the 2-stage (cold parison) method, the blow molding cycle of the blow molding system is set independently of the injection molding cycle of the preform injection molding system, and throughput can be improved. However, the energy efficiency decreases when using the 2-stage (cold parison) method since the preform that has been cooled to room temperature is heated to the optimum blow temperature.

An injection stretch blow molding system that utilizes the 1-stage (hot parison) method is configured so that the preform injection molding operation and the blow molding operation are implemented in-line. Specifically, N preforms that have been produced by injection molding using an injection molding section are subjected to blow molding in a state in which the preforms retain heat applied during injection molding to obtain N containers. A typical blow molding system is configured so that an injection molding section, a temperature control section, a blow molding section, and an ejection section are provided at four positions on a turntable, and a preform or a container is rotated using a neck mold (see Japanese Patent Application Publication No. JP-A-53-22096). In this case, a preform that has been produced by injection molding in an upright state is transferred in the upright state, and subjected to blow molding.

According to the 1-stage (hot parison) method, since the preform that retains heat applied during injection molding is subjected to blow molding to obtain a container, the thermal energy that is required for heating the preform to room temperature to the optimum blow temperature is unnecessary. However, the blow molding cycle of the blow molding system is the same as the injection molding cycle of the preform injection molding system, and the number of preforms simultaneously produced by injection molding is the same as the number of preforms simultaneously subjected to blow molding.

The applicant of the present application developed a practical 1.5-stage injection stretch blow molding system that effectively utilizes the advantages of the 1-stage method and the 2-stage method (see Japanese Patent No. 2954858). The 1.5-stage injection stretch blow molding system is basically configured so that the preform that retains heat applied during injection molding is subjected to blow molding to obtain a container in the same manner as in the case of using the 1-stage method. However, the blow molding cycle of the injection stretch blow molding system can be reduced as compared with the injection molding cycle of the preform injection molding system, and the ratio of the number (N) of preforms simultaneously produced by injection molding to the number (M) of preforms simultaneously subjected to blow molding can be set to 3:1, for example.

SUMMARY OF THE INVENTION

Several aspects of the invention may provide a 1.5-stage injection stretch blow molding device that effectively utilizes the advantages of the 1-stage method and the 2-stage method, and reduces the difference in molding temperature between n blow molding operations to improve molding quality when subjecting N (N is an integer equal to or larger than 2) preforms simultaneously produced by injection molding to blow molding in n operations in which M (M=N/n) preforms among the N preforms are separately subjected to blow molding.

Several aspects of the invention may provide a 1.5-stage injection stretch blow molding device that reduces the difference in temperature between M preforms to improve molding quality when simultaneously subjecting M preforms to blow molding using a blow molding section.

Several aspects of the invention may provide a versatile 1.5-stage injection stretch blow molding device that is configured so that the ratio of the number (N) of preforms simultaneously produced by injection molding to the number (M) of preforms simultaneously subjected to blow molding can be easily changed.

Several aspects of the invention may provide a molded article heating device that does not utilize an endless chain, and can make use of continuous transfer and intermittent transfer in combination.

According to a first aspect of the invention, there is provided an injection stretch blow molding device including:

an injection molding section that produces N (N is an integer equal to or larger than 2) preforms by injection molding;

a cooling section that subjects the N preforms produced by injection molding to forced cooling;

a heating section that continuously transfers and heats the N preforms subjected to forced cooling; and a blow molding section that subjects the N preforms heated by the heating section to stretch blow molding in n (n is an integer equal to or larger than 2) operations, the blow molding section simultaneously stretch blow molding M (M=N/n, M is a natural number) preforms among the N preforms into M containers.

According to the first aspect of the invention, the difference in molding temperature in each operation that subjects N preforms simultaneously produced by injection molding to blow molding in n operations in units of M preforms, or the difference in temperature between the preforms, can be reduced when using the 1.5-stage method. This ensures that the resulting containers have uniform molding quality. When N preforms simultaneously produced by injection molding are separately subjected to blow molding in n operations, the temperature of M preforms that are initially subjected to blow molding tends to be higher than the temperature of M preforms that are subsequently (finally) subjected to blow molding. This is because the time from the completion of injection molding to the start of blow molding is inevitably shorter for the initial heating operation than for the subsequent heating operation. Specifically, the advantage of the 1-stage method in that the injection molding operation and the blow molding operation are implemented in-line, and the preform is subjected to blow molding in a state in which the preform retains heat applied during injection molding to obtain a container, results in an deterioration in molding quality when using the 1.5-stage method in which the preforms are subjected to blow molding in n operations.

According to the first aspect of the invention, the ill effect of heat that is applied during injection molding and retained by the preforms on the preform temperature during the n blow molding operations can be reduced by subjecting the N preforms transferred from the injection molding section to forced cooling using a refrigerant. The temperature decrease gradient becomes steeper as the preform temperature increases. Therefore, when subjecting the preforms to forced cooling, the difference in temperature between the N preforms before heating decreases as compared with the case where the preforms are not subjected to forced cooling (i.e., subjected to natural cooling). Therefore, even if the temperature of the preform varies depending on each injection cavity of the injection molding section, the variation in temperature depending on each injection cavity can be reduced by subjecting the preforms to forced cooling. Since it is not necessary to cool the preforms to room temperature by forced cooling (differing from the 2-stage method), heat that is applied during injection molding and retained by the preforms can be used for blow molding.

According to a second aspect of the invention, there is provided an injection stretch blow molding device including:

an injection molding section that produces N (N is an integer equal to or larger 2) preforms by injection molding;

a heating section that continuously transfers and heats the N preforms transferred from the injection molding section; and a blow molding section that subjects the N preforms heated by the heating section to stretch blow molding in n (n is an integer equal to or larger than 2) operations, the blow molding section simultaneously stretch blow molding M (M=N/n, M is a natural number) preforms among the N preforms into M containers.

When the N preforms are heated during intermittent transfer, the N preforms are affected by the temperature distribution inside the heating section. Specifically, since the preforms that stop inside the heating section are heated during intermittent transfer, the temperature of the preforms that stop at the inlet and the outlet of the heating section tends to decrease. When the output of some heaters included in the heating section is low, for example, the preforms are easily affected by such a situation during intermittent transfer. In contrast, when the preforms are continuously transferred as in the first aspect and the second aspect of the invention, the preforms are uniformly heated, and have an identical heat history. Therefore, the above adverse effect can be prevented. This makes it possible to reduce the difference in temperature between the M preforms that are simultaneously stretch blow molding.

In the injection stretch blow molding device according to the first aspect or the second aspect of the invention, the heating section may heat M preforms among the N preforms that are initially subjected to blow molding and M preforms among the N preforms that are subsequently subjected to blow molding in a row during continuous transfer.

When M preforms among the N preforms that are initially subjected to stretch blow molding and M preforms among the N preforms that are subsequently subjected to blow molding are intermittently transferred in a row, the M preforms that are subjected to blow molding after the M preforms that are initially subjected to blow molding are not transferred to the heating section (standby period) when the M preforms that are initially subjected to blow molding are stopped in the heating section, and the difference in timing at which the preforms are transferred to the heating section increases. Specifically, the heating start timing after injection molding thus differs in units of M preforms. The difference in temperature between M preforms that are initially transferred to the heating section and M preforms that are subsequently transferred to the heating section can be reduced by subjecting the preforms to forced cooling before heating. The difference in timing of transfer to the heating section decreases when continuously transferring the preforms. A decrease in temperature of the preform increases as the standby time increases. However, the difference in temperature between M preforms that are initially transferred to the heating section and M preforms that are subsequently transferred to the heating section can be reduced by continuously transferring the preforms. This makes it possible to reduce the difference in molding temperature in each operation when subjecting N preforms simultaneously produced by injection molding to blow molding in n operations in units of M preforms.

In the injection stretch blow molding device according to the first aspect of the invention, each of the N preforms may include a neck, the injection molding section may produce the N preforms by injection molding in an upright state in which the neck is positioned on an upper side, the heating section may heat the N preforms in an inverted state in which the neck is positioned on a lower side, and the cooling section may include an inversion section; N first cooling pots that are provided on a first side of the inversion section, and N second cooling pots that are provided on a second side of the inversion section that is opposite to the first side.

According to the above configuration, since the preforms can be heated while transferring the preforms in the inverted state, it is possible to simplify the structure of the transfer member that transfers the preform in the heating section in the inverted state. Moreover, the cooling section can subject the N preforms to forced cooling even during the inversion operation.

In the injection stretch blow molding device according to the first aspect of the invention, a recess may be formed in an outer wall of each of the N first cooling pots and the N second cooling pots, and the inversion section may include a flow passage for a refrigerant, the flow passage including a first flow passage that communicates with the recess of the N first cooling pots to circulate the refrigerant, and a second flow passage that communicates with the recess of the N second cooling pots to circulate the refrigerant.

The cooling efficiency can be improved by bringing the refrigerant into direct contact with the outer wall of the first and second cooling pots. The first and second cooling pots are selectively used depending on the size of the preform. The inversion section in which the flow passages are formed can be used in common by merely forming the recess in the outer wall of the first and second cooling pots.

In the injection stretch blow molding device according to the first aspect of the invention, M may be an even number, and M/2 small diameter holes and M/2 large diameter holes may be formed as cooling pot insertion holes in each of the first side and the second side of the inversion section, the M/2 small diameter holes and M/2 large diameter holes being alternately formed at an equal pitch in each of n rows.

When producing a preform having a large diameter, the number of preforms simultaneously produced by injection molding in the injection molding section is reduced to N/2. In this case, N/2 cooling pots can be disposed on the first side and the second side by disposing the cooling pot in M/2 large diameter holes (n rows) formed in the inversion section. Since it is possible to simultaneously produce N preforms having a small diameter, N cooling pots can be disposed on the first side and the second side using M/2 small diameter holes and M/2 large diameter holes. When a cooling pot having an identical size is used for a preform having a small diameter, a space formed when inserting the cooling pot into the large diameter hole may be filled with a lining material or the like.

In the injection stretch blow molding device according to the first aspect of the invention, the cooling section may subject the N preforms to forced cooling over a time equal to or longer than an injection molding cycle time required for the injection molding section to produce the N preforms by injection molding.

It is possible to further reduce the difference in preform temperature in each of the n blow molding operation by thus providing a cooling time equal to or longer than the injection molding cycle time.

In the injection stretch blow molding device according to the first aspect of the invention, the N preforms in the upright state that have been produced by injection molding in an (m+1)th cycle may be held by the N second cooling pots, and cooled while the N preforms in the upright state that have been produced by injection molding in an mth cycle are held by the N first cooling pots, and cooled in the inverted state after being inverted by the inversion section.

According to the above configuration, the N preforms that have been produced by injection molding in the mth cycle are cooled in the N first cooling pots until the N preforms that have been produced by injection molding in the (m+1)th cycle are held by the N second cooling pots. This makes it possible to provide a cooling time equal to or longer than the injection molding cycle time.

In the injection stretch blow molding device according to the first aspect of the invention, the heating section may be disposed along a continuous transfer path that forms part of a transfer path in which (k×N) (k is an integer equal to or larger than 2) preforms that correspond to k injection molding cycles are transferred.

In the injection stretch blow molding device according to the first aspect of the invention, the transfer path may include a plurality of sprockets, a plurality of transfer members that respectively hold one preform, two transfer members among the plurality of transfer members that are adjacent to each other in a transfer direction coming in contact with each other, and a guide rail that guides the plurality of transfer members along the transfer direction to engage the plurality of sprockets.

According to a third aspect of the invention, there is provided a molded article heating device including:

a transfer path that transfers a plurality of molded articles; and a heating section that is provided along the transfer path, the transfer path including a plurality of sprockets, a plurality of transfer members that respectively hold one molded article, two transfer members among the plurality of transfer members that are adjacent to each other in a transfer direction coming in contact with each other, and a guide rail that guides the plurality of transfer members along the transfer direction to engage the plurality of sprockets.

According to the first aspect and the third aspect of the invention, a plurality of transfer members can be continuously transferred at a constant pitch without using an endless chain. For example, a plurality of transfer members can be transferred by causing the upstream-side transfer member that engages the continuous drive sprocket to press the transfer member that does not engage the sprocket on the downstream side. Since an endless chain is not used, the downstream-side transfer member that has been continuously transferred can be intermittently transferred by causing the transfer member to engage the intermittent drive sprocket. Therefore, continuous transfer and intermittent transfer can be performed using an identical transfer path. It is also possible to deal with a change in the number M of preforms simultaneously subjected to blow molding by utilizing each transfer member. A structure that does not utilize an endless chain may be widely used for a heating device for a molding device or a heating device for a crystallization device in addition to the 1.5-stage injection stretch blow molding device.

In the injection stretch blow molding system according to the first aspect of the invention or the molded article heating device according to the third aspect of the invention, M transfer members that are adjacent to each other in the transfer direction may be connected by a connection member to form one transfer jig, some sprockets among the plurality of sprockets that are adjacent to each other in the transfer direction may be continuously driven, and other sprockets among the plurality of sprockets that are adjacent to each other in the transfer direction may be intermittently driven at a high speed as compared with the some sprockets.

This makes it possible to easily implement continuous transfer and intermittent transfer in units of M preforms or a plurality of molded articles. For example, the upstream-side transfer member can be caused to come in contact with the downstream-side transfer member that is continuously transferred, by driving the intermittent drive sprocket (discharge device) that engages the upstream-side transfer member at a high speed as compared with the downstream-side continuous drive sprocket. It is also possible to intermittently transfer the transfer jig that has been continuously transferred by intermittently transferring some of the M downstream-side transfer members at a high speed. When implementing a heating device for a device other than the 1.5-stage injection stretch blow molding device, a plurality of transfer members that are adjacent to each other in the transfer direction may be connected by the connection member to form one transfer jig.

In the injection stretch blow molding device according to the first aspect of the invention, the cooling section may transfer the N preforms subjected to forced cooling to n transfer jigs.

According to the above configuration, the difference in temperature can be reduced by subjecting the N preforms simultaneously produced by injection molding to forced cooling, and the M preforms can be mounted on n transfer members, and heated during continuous transfer.

The injection stretch blow molding device according to the first aspect of the invention may further include a discharge device that sequentially discharges the n transfer jigs, and causes a forefront transfer member of the transfer jig to engage a drive sprocket among the plurality of sprockets that is positioned on a most upstream side.

This makes it possible to sequentially transfer n transfer jigs, and supply the transfer jigs to the continuous transfer path in a row.

The injection stretch blow molding device according to the first aspect of the invention may further include an intermittent transfer mechanism that intermittently transfers the M preforms heated by the heating section to the blow molding section.

According to the above configuration, the preforms can be continuously transferred in the heating section that may affect the molding quality, and M preforms (blow molding unit) can then be intermittently transferred.

The injection stretch blow molding device according to the first aspect of the invention may further include a removal device that removes the N preforms from the injection molding section; a transfer device that transfers the N preforms from the removal device to the cooling section, the injection molding section may simultaneously produce M preforms among the N preforms by injection molding in each of n rows that are parallel to a first direction, a first interval between two adjacent preforms in each of the n rows at a center position in the first direction may differ from a second interval between two other preforms when M is an even number, the removal device may transfer the M preforms in each of the n rows from the injection molding section along a second direction that is perpendicular to the first direction, and change a preform arrangement pitch in the second direction to a narrow pitch, the transfer device may change the first interval so that the first interval coincides with the second interval, and the cooling section may simultaneously subject M preforms among the N preforms to forced cooling in each of n rows that are parallel to the first direction.

According to the above configuration, since forced cooling in the cooling section and continuous heating in the heating section can be implemented at a pitch narrower than the injection molding pitch, the size of the device can be reduced. The first interval between two adjacent preforms in each of the n rows at the center position in the first direction is set to differ from the second interval between two other preforms during injection molding taking account of the arrangement of the nozzle of a hot runner mold. In this case, since the transfer device can set the first interval and the second interval to constant values, the preforms can be arranged at equal intervals in each of the n rows. Therefore, the interval between the preforms that are continuously transferred in the heating section can be made constant, and the effects from the adjacent preforms during continuous transfer can be made uniform.

According to a fourth aspect of the invention, there is provided an injection stretch blow molding device including:

an injection molding section that produces N (N is an integer equal to or larger 2) preforms by injection molding, the injection molding section simultaneously producing M (M=N/n, M is a natural number) preforms by injection molding in each of n (n is an integer equal to or larger than 2) rows that are parallel to a first direction;

a cooling section that subjects the N preforms transferred from the injection molding section in a second direction perpendicular to the first direction to forced cooling in each of n rows that are parallel to the first direction in units of M preforms;

a heating section that continuously transfers and heats the N preforms that have been cooled and transferred in the first direction in units of M preforms along a roundabout path; and a blow molding section that subjects the N preforms heated by the heating section to stretch blow molding in n (n is an integer equal to or larger than 2) operations, M preforms being simultaneously and intermittently transferred to the blow molding section along the second direction, and the blow molding section simultaneously stretch blow molding M preforms into M containers.

The injection stretch blow molding device according to the fourth aspect of the invention operates in the same manner as the injection stretch blow molding device according to the first aspect of the invention, and is also characterized in that the injection molding section, the cooling section, and the blow molding section are arranged along the second direction, and the heating section is disposed along a roundabout path in at least an area adjacent to the cooling section in the first direction. This makes it possible to reduce the total length of the device in the second direction. Since the heating section heats the preforms that retain heat applied during injection molding, and the heating transfer path can be formed along a roundabout path, an increase in the total width of the device in the first direction can be suppressed. Therefore, the installation area of the device can be reduced.

BRIEF DESCRIPTION OF THE DRAWINGS

FIG. 16B is a cross-sectional view illustrating a preform holder.

DESCRIPTION OF THE EXEMPLARY EMBODIMENTS

Exemplary embodiments of the invention are described in detail below with reference to a comparative example. Note that the following exemplary embodiments do not in any way limit the scope of the invention defined by the claims laid out herein. Note also that all of the elements described in connection with the following exemplary embodiments should not necessarily be taken as essential elements of the invention.

1. Injection Stretch Blow Molding Device

Figure 1:
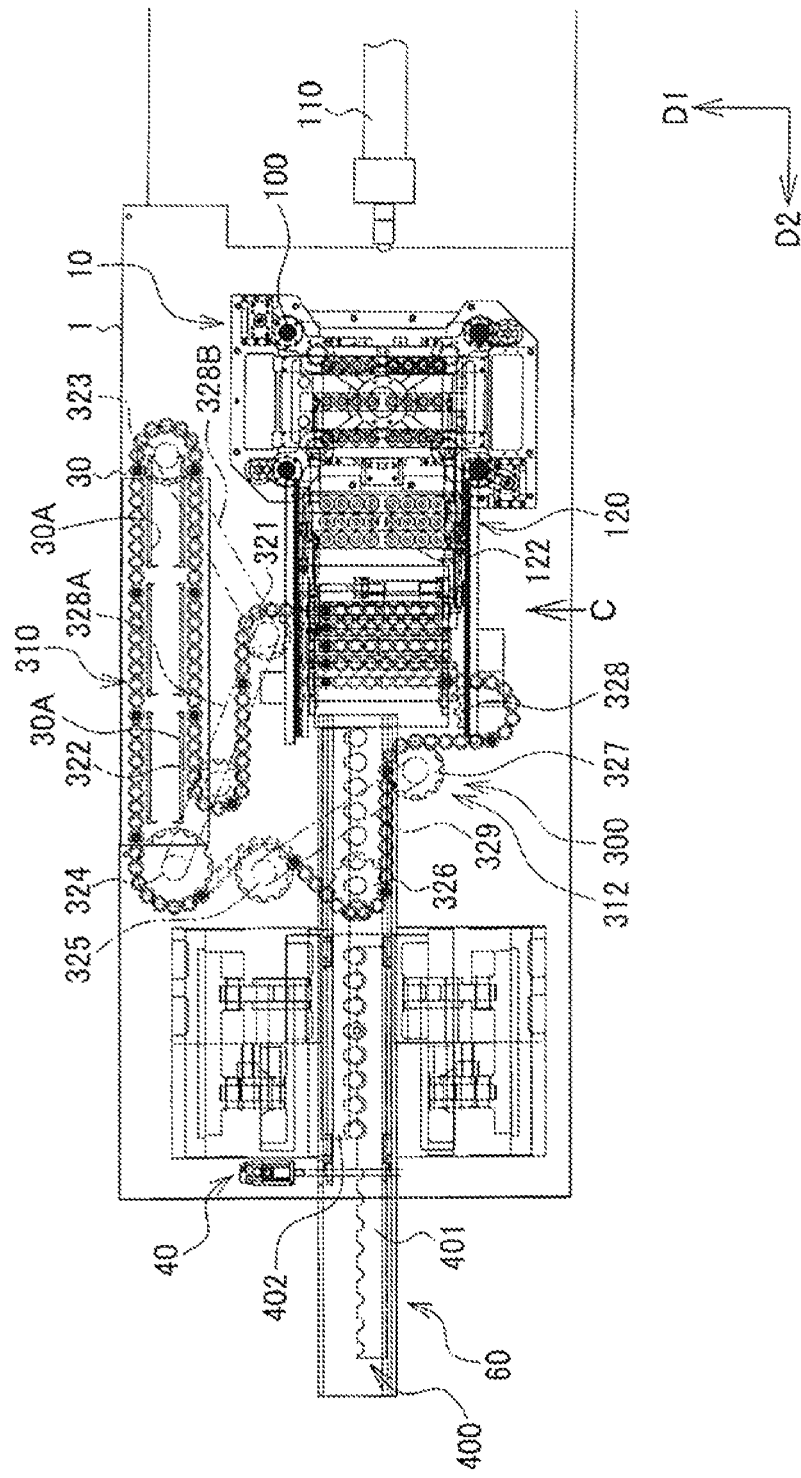
FIG. 1 is a plan view illustrating an injection stretch blow molding device according to one embodiment of the invention.
Figure 2:
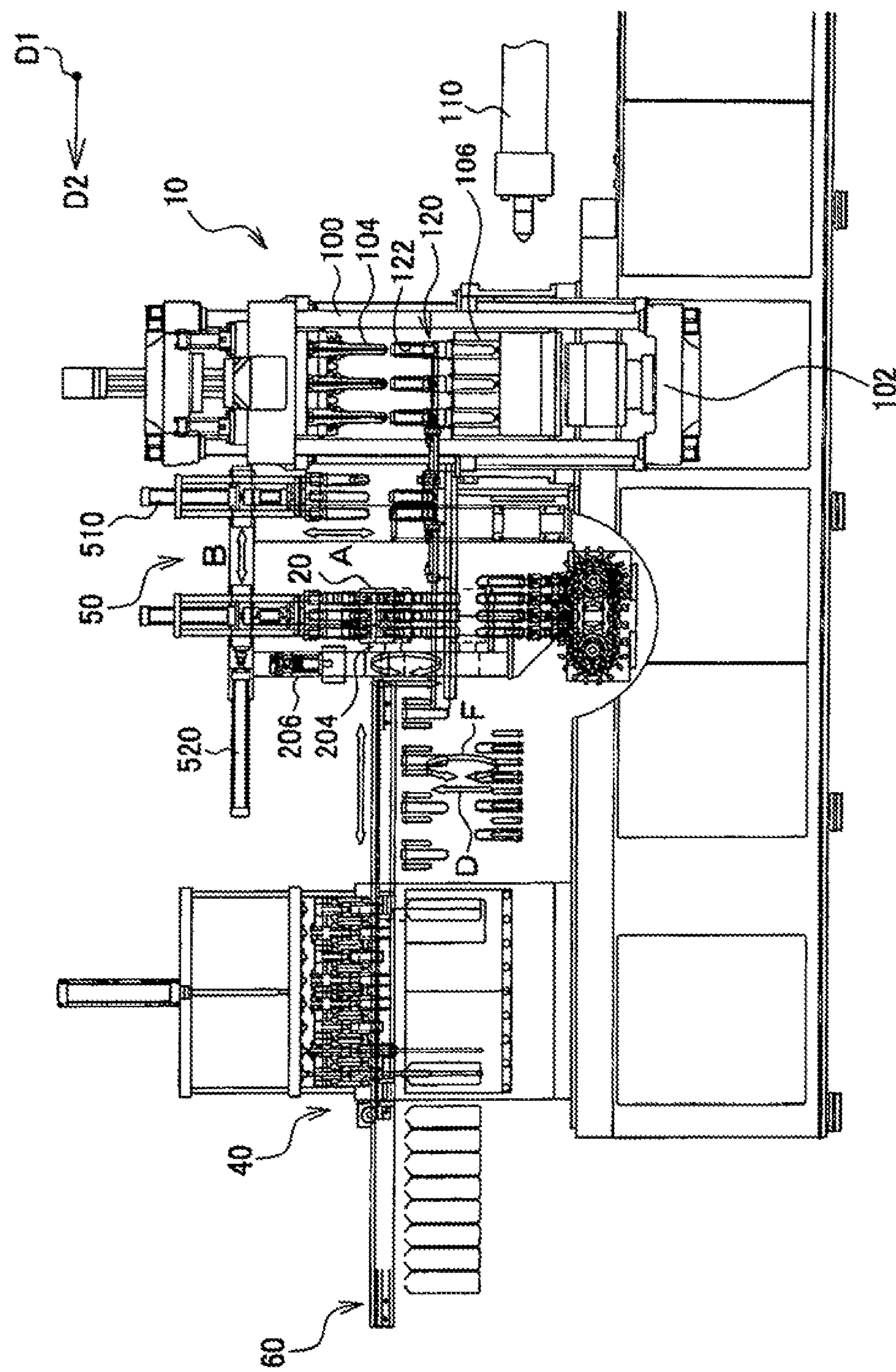
FIG. 2 is a front view illustrating the injection stretch blow molding device illustrated in FIG. 1.

FIG. 1 is a plan view illustrating an injection stretch blow molding device, and FIG. 2 is a front view illustrating the injection stretch blow molding device. As illustrated in FIGS. 1 and 2, an injection molding section 10, a cooling section 20, a heating section 30, and a blow molding section 40 are provided on a stage 1 of the injection stretch blow molding device.

Several embodiments of the invention implement a 1.5-stage injection stretch blow molding device that utilizes a 1-stage method in which the injection molding operation and the blow molding operation are implemented in-line, but has a configuration in which the number of preforms simultaneously produced by injection molding differs from the number of preforms simultaneously subjected to blow molding. The injection stretch blow molding device includes the cooling section 20 between the injection molding section 10 and the heating section 30. The cooling section 20 subjects the preform transferred from the injection molding section 10 to forced cooling. Specifically, the configuration of the injection stretch blow molding device clearly differs from a configuration in which the preform immediately after being produced by the injection molding section 10 is subjected to forced cooling to the release temperature using the injection core mold and/or the injection cavity mold.

In several embodiments of the invention, the difference in molding temperature in each operation when subjecting N preforms simultaneously produced by injection molding to blow molding in n operations in units of M preforms, is reduced by subjecting the preforms to forced cooling before heating so that the resulting containers have uniform molding quality.

The planar layout of the 1.5-stage injection stretch blow molding device is described below. As illustrated in FIGS. 1 and 2, the injection molding section 10 produces N preforms by injection molding, the injection molding section 10 simultaneously producing M (M=N/n, M is a natural number) preforms by injection molding in each of n (n is an integer equal to or larger than 2) rows that are parallel to a first direction D1. The cooling section 20 subjects the N preforms transferred from the injection molding section 10 in a second direction D2 perpendicular to the first direction D1 to forced cooling in each of n rows that are parallel to the first direction D1 in units of M preforms. The heating section 30 continuously transfers and heats the N preforms that have been cooled and transferred in the first direction D1 in units of M preforms along a roundabout path. The blow molding section 40 subjects the N preforms that have been heated to stretch blow molding, the blow molding section 40 simultaneously stretch blow molding M preforms among the N preforms into M containers, the M preforms being intermittently transferred to the blow molding section 40 along the second direction D2.

The injection stretch blow molding device is configured so that the injection molding section 10, the cooling section 20, and the blow molding section 40 are arranged on the stage 1 along the second direction D2, and the heating section 30 is disposed in at least an area adjacent to the cooling section 20 in the first direction D1. This makes it possible to reduce the total length of the injection stretch blow molding device in the second direction D2. Since the heating section 30 heats the preforms that retain heat applied during injection molding, and the heating transfer path can be formed along a roundabout path, an increase in the total width of the injection stretch blow molding device in the first direction D1 can be suppressed. Therefore, the installation area of the injection stretch blow molding device can be reduced.

2. Injection Molding Section

The injection molding section 10 includes a clamping mechanism 102 that clamps molds along four tie rods 100 illustrated in FIG. 1. The clamping mechanism 102 clamps an injection core mold 104 (see FIG. 2) and an injection cavity mold 106. An injection device 110 brings a nozzle into contact with a hot runner mold, and injects a resin to produce a preform by injection molding.

As illustrated in FIG. 1, the number N of preforms simultaneously produced by injection molding in the injection molding section 10 is 24 (3 (rows)×8) at a maximum for example. When the diameter of the preform is large, four preforms are produced by injection molding in each row (i.e., N=12). For example, twenty-four (N=24) injection cavity molds 106 are disposed in the injection molding section 10 when molding a 1.5-liter container, and twelve (N=12) injection cavity molds 106 are disposed in the injection molding section 10 when molding a 5-liter container. The injection core mold 104 and the injection cavity mold 106 have a function of subjecting the preform to forced cooling using a refrigerant, and the preform is cooled to a temperature at which the preform can be removed from the injection core mold 104 and the injection cavity mold 106. The cooling section 20 cools the preform in a manner differing from the injection core mold 104 and the injection cavity mold 106.

The injection molding section 10 includes a removal device 120 that removes the N preforms produced by injection molding. The removal device 120 is configured so that N (3 (rows)×8) pots 122 (i.e., holding members) can move horizontally between a receiving position under the injection core mold 104 and a transfer position that is situated outside the space defined by the tie rods 100. The row pitch of the pots 122 is changed from a wide pitch (injection molding pitch) at the receiving position to a narrow pitch at the transfer position during the horizontal movement of the pots 122. Note that two pots among the three pots drawn at the transfer position are pots used for a preform having a large diameter and a large length (i.e., the pots drawn at the receiving position), and the remaining pot among the three pots is a pot used for a preform having a small diameter and a small length. Specifically, the size and the number of pots 122 are changed corresponding to the size of the preform. In FIG. 2, the pots 122 are drawn by the solid line at the receiving position and the transfer position for convenience of illustration. The pots 122 stand still at the receiving position or the transfer position in the actual situation.

The injection molding section 10 that includes the removal device 120 may be implemented in the same manner as that included in the preform molding device disclosed in Japanese Patent Application No. 4148576, for example. Note that the injection molding section 10 is not limited thereto.

3. Cooling Section

The N preforms produced by injection molding are transferred to the cooling section 20 that subjects the preforms to forced cooling. As illustrated in FIG. 2, a preform transfer device 50 is provided in order to transfer the preforms. The preform transfer device 50 transfers the N preforms held by the pots 122 (3 rows) that are situated at the transfer position (see FIG. 2) to the cooling section 20. The preform transfer device 50 includes a preform holder 500 (see FIGS. 3A and 3B), a first air cylinder 510 that moves the preform holder 500 upward and downward in the direction A illustrated in FIG. 2, and a second air cylinder 520 that horizontally moves the preform holder 500 and the first air cylinder 510 in the direction B illustrated in FIG. 2 (see FIG. 2).

Figure 3A:
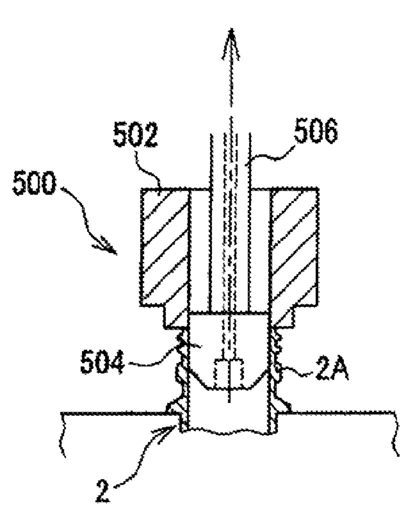
FIGS. 3A and 3B are views illustrating a preform holding state and a preform holding cancellation state of a preform transfer device disposed between an injection molding section and a cooling section.

As illustrated in FIG. 3A, the preform holder 500 includes a hollow holder main body 502 that comes in contact with the end face of a neck 2A of a preform 2 held by the pot 122 (see FIG. 2), a core 504, and a rod 506, the core 504 and the rod 506 being movably supported by the holder main body 502. The core 504 can be inserted into the neck 2A of the preform 2 by lowering the rod 506 using a drive mechanism (not illustrated in the drawings). The preform 2 is sucked via a suction hole formed in the core 504 and the rod 506, and adheres to the holder main body 502. The preform 2 is released by removing the core 504 from the neck 2A, and stopping the suction operation (see FIG. 3B).

As illustrated in FIG. 1, the arrangement pitch of the preforms (injection molding cavities) (3 rows) may be increased in the injection molding section 10 at the center in each row in order to provide a uniform resin path length in the hot runner mold. In this case, the preform transfer device 50 may have a function of adjusting the arrangement pitch of the preforms in each row to a uniform pitch.

Figure 4:
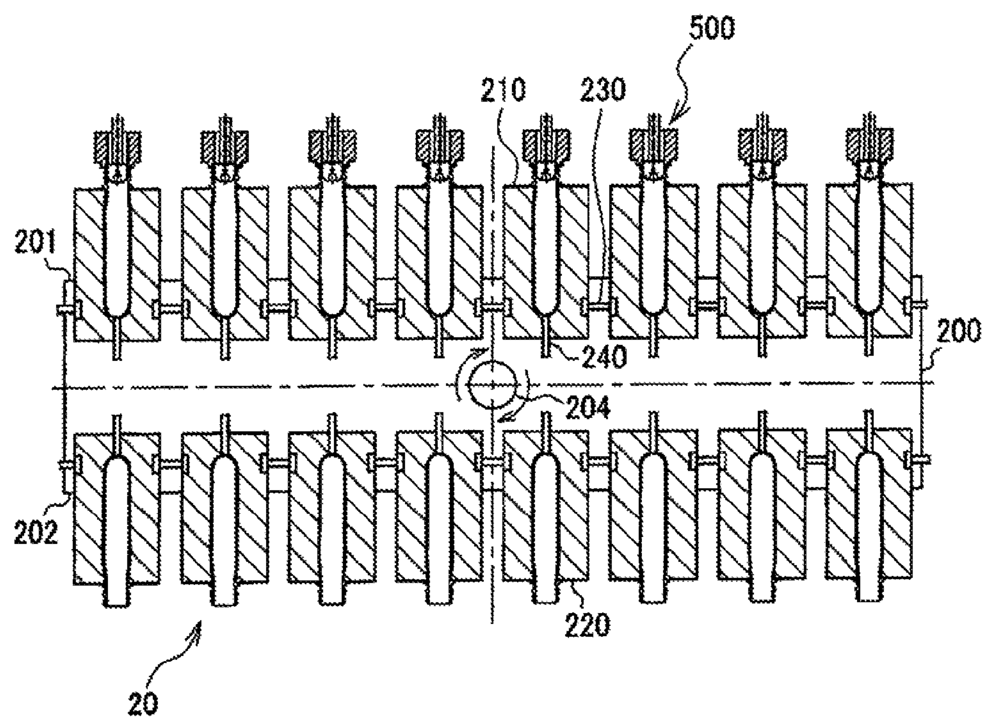
FIG. 4 is a front view illustrating a cooling section that includes an inversion section.

As illustrated in FIG. 4, the cooling section 20 may include an inversion section 200, N first cooling pots 210 that are provided on a first side 201 of the inversion section 200, and N second cooling pots 220 that are provided on a second side 202 of the inversion section 200 opposite to the first side 201. The first cooling pots 210 and the second cooling pots 220 are cooled by a refrigerant that is circulated through a refrigerant passage 230. The first cooling pots 210 and the second cooling pots 220 have a suction hole 240 for sucking the preform 2. The inversion section 200 can be inverted around a shaft 204. The inversion section 200 can be moved upward and downward using a ball screw that is driven by a servomotor 206 (i.e., drive source) (see FIG. 2).

The injection molding section 10 produces the N preforms 2 by injection molding in an upright state in which the neck 2A is positioned on the upper side. The inversion section 200 can invert the N preforms 2 in the upright state to an inverted state in which the neck 2A is positioned on the lower side. Specifically, the inversion operation can be performed during cooling, and a long cooling time can be provided without separately providing an inversion time and the like.

The cooling section 20 can subject the N preforms 2 to forced cooling over a time equal to or longer than the injection molding cycle time required for the injection molding section 10 to produce the N preforms 2 by injection molding.

Therefore, N preforms 2 in the upright state that have been produced by injection molding in the (m+1)th cycle are held by the N second cooling pots 220, and cooled while N preforms 2 in the upright state that have been produced by injection molding in the mth cycle are held by the N first cooling pots 210, inverted by the inversion section 200, and cooled in the inverted state. Specifically, N preforms 2 that have been produced by injection molding in the mth cycle and N preforms 2 that have been produced by injection molding in the (m+1)th cycle are temporarily present in the inversion section 200. Therefore, the N preforms 2 that have been produced by injection molding in the mth cycle are subjected to forced cooling over a time equal to or longer than the injection molding cycle time of the N preforms 2 that are produced by injection molding in the (m+1)th cycle.

The preform subjected to forced cooling by the cooling section 20 over a time equal to or longer than the injection molding cycle time is not cooled to room temperature. However, a preform formed of polyethylene terephthalate (PET) can be cooled to a temperature of about 70 to 80° C. that is lower than the release temperature by about 10° C. The forced cooling step performed by the cooling section 20 reduces the difference in temperature between the N preforms 2 that have been simultaneously produced by injection molding immediately before heating even when the heating start timing is changed. When subjecting the N preforms 2 that retain heat applied during injection molding to natural cooling, a significant difference in temperature is observed between the N preforms 2 immediately before heating depending on the natural cooling time.

The 1.5-stage injection stretch blow molding device according to one embodiment of the invention subjects the preforms 2 transferred from the injection molding section 10 to forced cooling as described above. Since the preforms 2 need not be cooled to room temperature, and retain heat applied during injection molding, high energy efficiency achieved by a 1-stage device can also be achieved.

4. Heating Section

The heating section 30 heats the cooled N preforms 2 to an optimum stretch temperature. The heating section 30 heats the N preforms 2 in an inverted state in which the neck 2A is positioned on the lower side. The heating section 30 heats the N preforms 2 while continuously transferring the N preforms 2.

Figure 5:
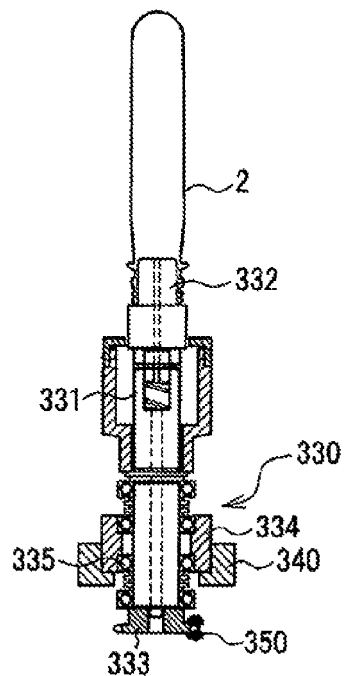
FIG. 5 is a front view illustrating a transfer member that transfers a preform in a heating section.
Figure 6:
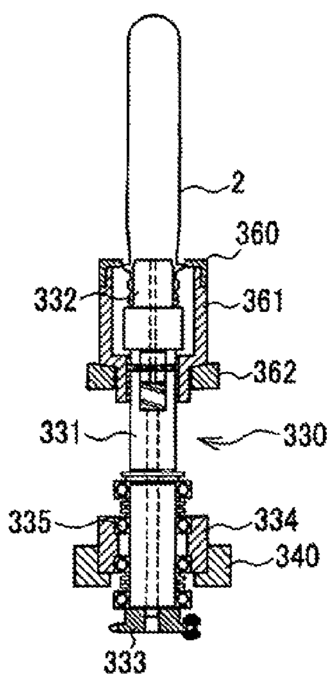
FIG. 6 is a view illustrating a state in which a neck of a preform is shielded from heat using the transfer member illustrated in FIG. 5.

The heating section 30 is disposed along a continuous transfer path 310 that forms part of a transfer path 300 that forms a closed loop or a circulation loop in which (k×N) preforms 2 (k is an integer equal to or larger than 2) that correspond to k cycles are transferred. The transfer path 300 may include a plurality of sprockets 321 to 328 (see FIG. 1), a plurality of transfer members 330 (see FIGS. 5 and 6) that can engage the plurality of sprockets 321 to 328, and respectively hold one preform 2, and a guide rail 340 (see FIGS. 5 and 6) that guides the plurality of transfer members 330 along the transfer direction. The transfer path 300 includes the upstream-side continuous transfer path 300 and a downstream-side intermittent transfer path 312. As illustrated in FIGS. 5 and 6, the transfer member 330 is configured so that a holding section 332 that is inserted into the neck 2A is secured on one end (upper end) of a rotation shaft 331, and a sprocket 333 to which a rotation drive force is applied is secured on the other end (lower end) of the rotation shaft 331. The sprocket 333 engages a stationary or movable chain 350 disposed in the heating section 30 (see FIG. 1), and rotates together with the rotation shaft 331.

The heating section 30 may have a configuration in which quartz heaters 30A (i.e., heaters) and a mirror (not illustrated in the drawings) are disposed on either side of the continuous transfer path 310, the quartz heaters 30A being disposed in a plurality of stages in the height direction, and disposed at intervals in the transfer direction. In the heating section 30, a hot blast may be blown from the back side of the heater, and guided along the transfer direction of the preforms 2. Note that a variation in temperature does not occur since the preforms 2 are rotated during heating.

A heat shield member 360 is supported by a slider 361 disposed around the rotation shaft 331. When the slider 361 is moved upward by a cam 362 (see FIG. 6), the heat shield member 360 surrounds the neck 2A of the preform 2 to shield the neck 2A from heat.

Figure 7:
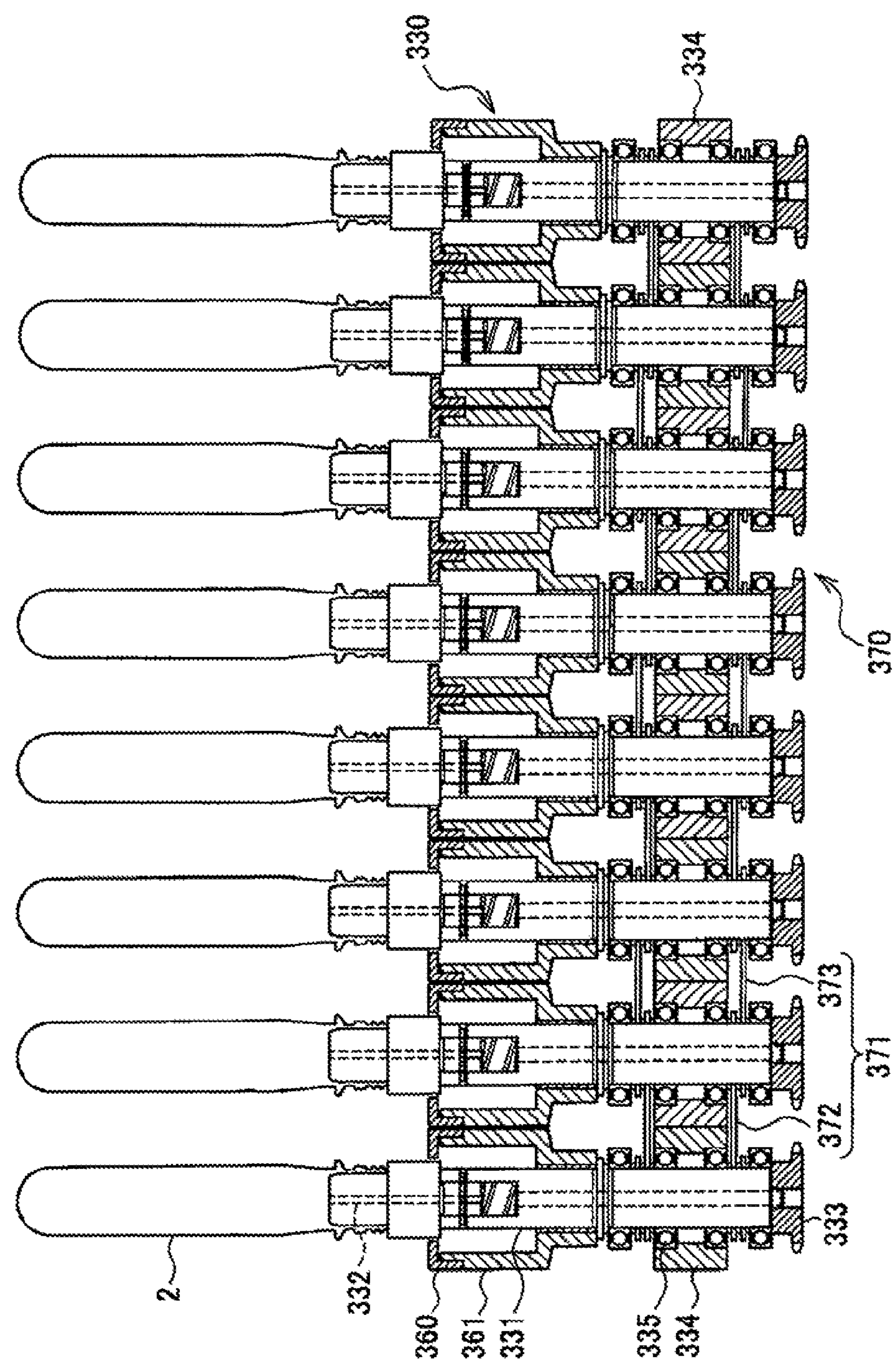
FIG. 7 is a front view illustrating a transfer jig formed by connecting M transfer members using a connection member.

As illustrated in FIG. 7, ring-like members 334 of two transfer members 330 adjacent to each other in the transfer direction come in contact with each other. The ring-like member 334 is supported by the rotation shaft 331 via a rotation bearing 335. The ring-like member 334 has a circular outer circumferential shape, for example. The adjacent ring-like members 334 come in rolling contact with each other. Therefore, the adjacent ring-like members 334 can maintain the rolling contact relationship even when transferred along a curved transfer path.

As illustrated in FIG. 7, M (e.g., M=8) transfer members 330 that are consecutive in the transfer direction may be connected by a connection member 371 to form a transfer jig 370. The connection member 371 includes an inner link 372 that connects one rotation shaft 331 with another rotation shaft 331 adjacent thereto on the upstream side, and an outer link 373 that connects one rotation shaft 331 with another rotation shaft 331 adjacent thereto on the downstream side, for example. The connection member 371 that is formed by connecting the inner link 372 and the outer link 373 forms a chain, and the chain (connection member) 371 engages the plurality of sprockets 321 to 328 illustrated in FIG. 1. Specifically, the connection member 371 that connects the M transfer members 330 is used as a chain instead of using an endless chain.

When forming the transfer jig 370 by connecting the M transfer members 330 (see FIG. 7), it is necessary to provide the transfer jig 370 corresponding to the number M of preforms simultaneously subjected to blow molding that may be changed. On the other hand, it is easy to deal with a change in the number M of preforms simultaneously subjected to blow molding when using the transfer members 330 that are not connected. However, when using the transfer members 330 that are not connected, it is necessary to provide each transfer member 330 with a member that corresponds to the chain that engages the continuous/intermittent drive members (e.g., sprockets 231 to 238).

The sprockets 321, 323, and 324 among the plurality of sprockets 321 to 328 disposed in the transfer path 300 may be continuous drive sprockets, the sprockets 325 and 327 among the plurality of sprockets 321 to 328 may be intermittent drive sprockets, and the sprockets 322, 326, and 328 among the plurality of sprockets 321 to 328 may be driven sprockets, for example. A continuous drive source drives the sprocket 324, and the driving force is transmitted to the continuous drive sprockets 321 and 323 via belts 328A and 328B, for example. An intermittent drive source drives the sprocket 325, and the driving force is transmitted to the intermittent drive sprocket 327 via a belt 329, for example. Specifically, an upstream path 320 of the transfer path 300 is a continuous drive path, and the downstream path 312 is an intermittent drive path (i.e., the loop-like transfer path 300 includes a continuous drive path and an intermittent drive path in combination).

Figure 8A:
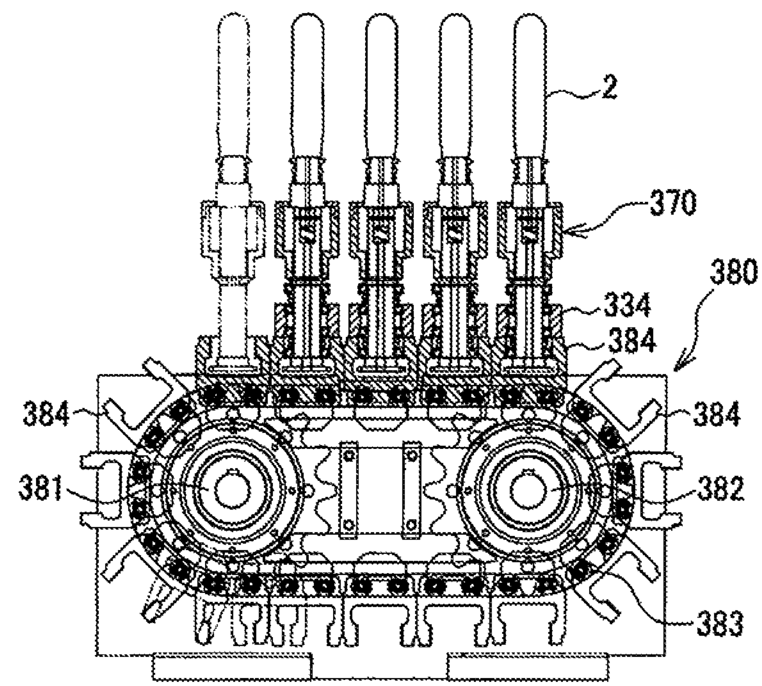
FIGS. 8A and 8B are respectively a front view and a plan view illustrating a parallel transfer device that transfers a plurality of transfer jigs in parallel.
Figure 8B:
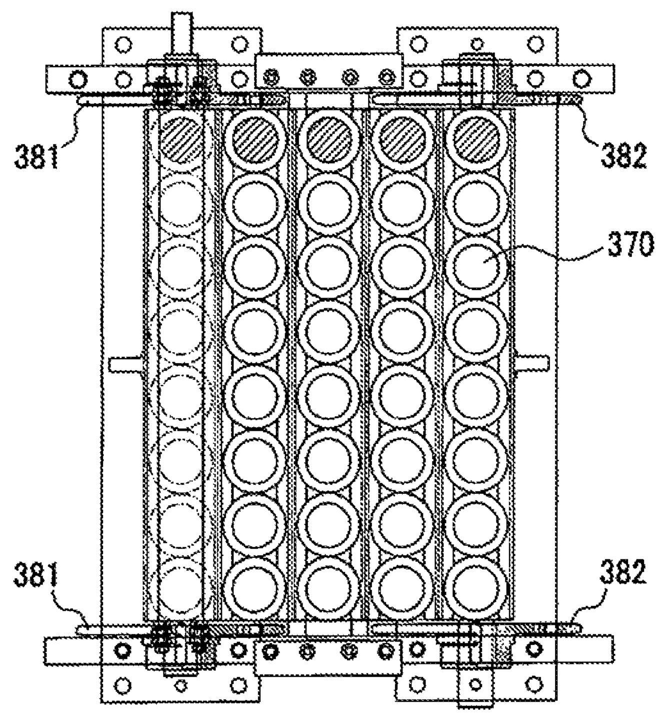

A parallel driving device 380 that drives (n+1) or more (e.g., four) transfer jigs 370 in parallel is disposed under the cooling section 20 illustrated in FIG. 2. As illustrated in FIGS. 8A and 8B, the parallel driving device 380 is formed by attaching the ends of a plurality of transfer rails 384 to two chains 383 that are fitted around sprockets 381 and 382 that are disposed on each end of each shaft. The transfer jig 370 that is guided by the driven sprocket 328 illustrated in FIG. 1 is slid into each transfer rail 384 in the longitudinal direction, and the eight ring-like members 334 of the transfer jig 370 are placed on and supported by the transfer rail 384.

One of the sprockets 381 and 382 is then rotated by one step to transfer the transfer rail 384 by one step. The above operation is repeated to dispose four transfer jigs 370 on the parallel driving device 380. As illustrated in FIG. 2, the preforms 2 are transferred from the cooling section 20 (inversion section 200) to n (n=N/M (e.g., n=3)) downstream-side transfer jigs 370.

As illustrated in FIG. 1, the transfer jig 370 in the first row among the transfer jigs 370 (four rows) disposed on the parallel driving device 380 is pushed out in the arrow direction C by a discharge device (not illustrated in FIG. 1) formed by an air cylinder or the like. Therefore, the eight transfer members 330 (transfer jig 370) that hold the preform 2 sequentially engage the continuous drive sprocket 321, and are sequentially (continuously) transferred.

In FIGS. 1 and 8B, the position of the forefront transfer member 330 (preform 2) of one transfer jig 370 is marked for convenience of explanation. The forefront transfer member 330 of the transfer jig 370 in the first row in FIG. 8B is transferred by the discharge device, and engages the continuous drive sprocket 321 on the most upstream side. A continuous transfer force is then applied to the transfer jig 370 from the continuous drive sprocket 321.

When the driving force is applied to each transfer jig 370 (transfer member 330) that engages the continuous drive sprockets 321, 323, and 324 present in the continuous transfer path 310, another transfer jig 370 (transfer member 330) that is positioned on the upstream side and does not engage the continuous drive sprocket is pressed, and a plurality of transfer jigs 370 are continuously transferred along the continuous transfer path 310.

Figure 9:
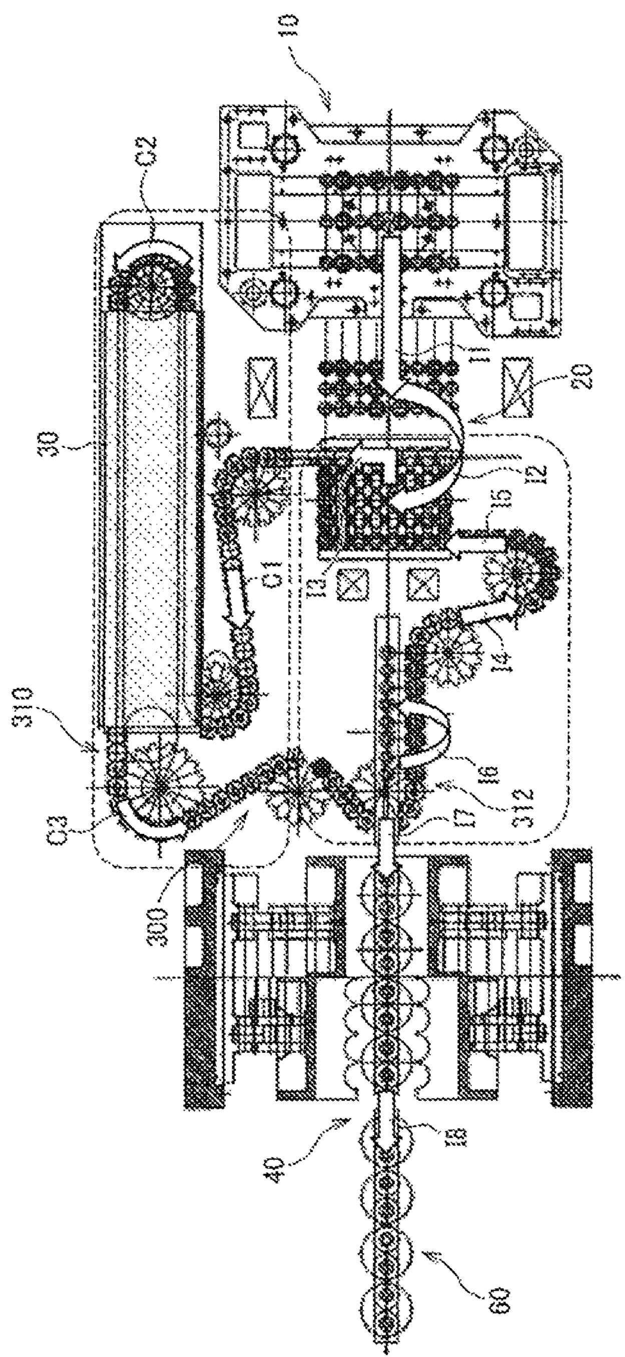
FIG. 9 is a view illustrating intermittent transfer and continuous transfer in an injection stretch blow molding device.

A schematic transfer motion of the preforms 2 in the injection molding step, the cooling step, and the heating step is described below with reference to FIG. 9. In FIG. 9, reference signs I1 to I8 indicate intermittent transfer, and reference signs C1 to C3 indicate continuous transfer.

The N preforms 2 that have been produced by injection molding in the injection molding section 10 are removed from the pots 122 after the pots 122 have been intermittently transferred by the removal device 120 in the direction indicated by I1. The preforms 2 are transferred to the cooling section 20 via the preform transfer device 50, inverted in the cooling section 20 in the direction indicated by I2, and mounted on three transfer jigs 370 disposed on the parallel driving device 380 in units of M preforms.

The forefront transfer jig 370 disposed on the parallel driving device 380 is intermittently transferred by the discharge device (not illustrated in FIG. 9) in the direction indicated by I3, and transferred to the continuous transfer path 310. A plurality of transfer jigs 370 are continuously transferred along the continuous transfer path 310 due to the driving force applied by the continuous drive sprockets 321, 323, and 324, and contact between the adjacent transfer members 370 via the ring-like members 334. The preforms 2 are heated by the heating section 30 while rotating.

In FIG. 1, the intermittent transfer path 312 on the downstream side of the transfer path 300 is in a state immediately after completion of intermittent transfer. A blank area that corresponds to the length of one transfer jig 370 is present on the upstream side of the transfer jig 370 that engages the continuous drive sprocket 324. Specifically, a plurality of transfer jigs 370 positioned on the upstream side of the transfer jig 370 that engages the continuous drive sprocket 324 are intermittently transferred at a speed higher than that during continuous transfer due to intermittent drive of the intermittent drive sprockets 325 and 327 (see the arrow indicated by I4 in FIG. 9).

The continuous drive sprocket 324 is continuously driven from the state illustrated in FIG. 1, and the transfer jigs 370 that engage the continuous drive sprocket 324 are continuously transferred. In this case, the intermittent drive sprocket 325 engages the transfer jigs 370, and rotates dependently. The intermittent drive sprocket 325 then comes in contact with the upstream-side transfer jig 370 that has intermittently stopped in the intermittent transfer path 312 via the ring-like member 334, and intermittent transfer is performed at this timing. Therefore, a blank area that corresponds to the length of one transfer jig 370 is present again on the upstream side of the transfer jig 370 that engages the continuous drive sprocket 324. The above operation is repeated. The transfer jig 370 is sequentially transferred to the transfer rail 384 of the parallel driving device 380 (see FIG. 8A) each time intermittent drive is performed (see the arrow indicated by I5 in FIG. 9). The transfer jigs 370 that hold M new preforms 2 are intermittently supplied to the continuous transfer path 310 in synchronization with the above operation (see the arrow indicated by I3 in FIG. 9).

5. Blow Molding Section

The blow molding section 40 subjects M preforms to biaxial stretching by blowing air and vertically driving a stretching rod to obtain containers. A blow cavity mold, a blow core mold, and an optional bottom mold (not illustrated in the drawings) are clamped. The structure of each mold is well-known in the art. Therefore, description thereof is omitted. An intermittent transfer mechanism 400 is provided to transfer M preforms 2 from the heating section 30 to the blow molding section 40. The intermittent transfer mechanism 400 includes a pair of neck holding plates 401 and 402, for example. In FIG. 1, the neck holding plates 401 and 402 are illustrated at a position before or after the movement. The preforms 2 are transferred in a state in which the neck 2A is held by the neck holding plates 401 and 402.

In one embodiment of the invention, the preforms 2 are subjected to blow molding in the blow molding section 40 in the upright state, and transferred by the neck holding plates 401 and 402 in the upright state. The neck holding plates 401 and 402 are also used when removing the M containers obtained by blow molding using an ejection section 60.

M transfer arms (not illustrated in the drawings) are used to transfer M preforms 2 from the heating section 30 to the blow molding section 40. As illustrated in FIG. 2, M preforms 2 are removed in the inverted state from the transfer jigs 370 that have been intermittently transferred on the downstream side of the transfer path 300 in the direction D, and inverted to the upright state in the direction F using the transfer arms (see the arrow indicated by I6 in FIG. 9).

The transfer arm also has a function of changing the arrangement pitch from the narrow pitch during heating to the wide pitch during blow molding (see FIG. 2). A state in which eight (M=8) preforms having a small diameter and a small length are inverted and changed in pitch, and a state in which four (M=4) preforms having a large diameter and a large length are inverted and changed in pitch, are drawn in FIG. 2 for reference (see the arrows indicated by D and F).

The preforms 2 are then transferred from the transfer arms to the neck holding plates 401 and 402, and transferred to the blow molding section 40 (see the arrow indicated by I7 in FIG. 9). Note that the operation (indicated by I7 in FIG. 9) that transfers the preforms 2 to the blow molding section 40, and the operation (indicated by I7 in FIG. 9) that transfers the containers obtained by blow molding to the ejection section 60, may be performed at the same time using the neck holding plates 401 and 402.

6. Advantageous Effects of Injection Stretch Blow Molding Device

According to the embodiments of the invention, the difference in molding temperature in each operation when subjecting N preforms simultaneously produced by injection molding to blow molding in n operations in units of M preforms, can be reduced when using the 1.5-stage method. The details thereof are described below with reference to FIG. 10 using a comparative example.

Figure 10:
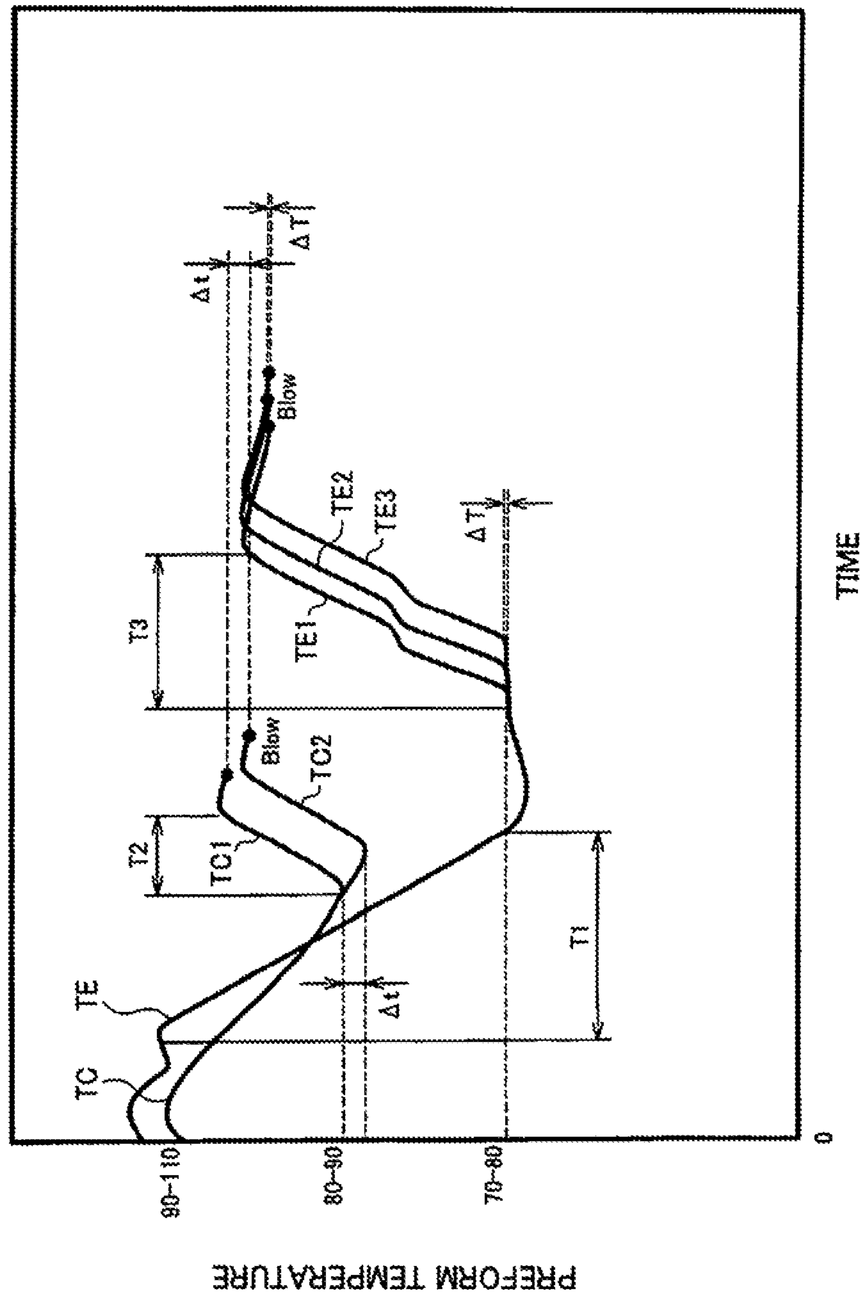
FIG. 10 is a characteristic diagram illustrating a change in preform temperature in one embodiment of the invention and a comparative example.

FIG. 10 shows the preform temperature TE according to one embodiment of the invention, and the preform temperature TC in the 1.5-stage device disclosed in Japanese Patent No. 2954858 (comparative example). In one embodiment of the invention, twenty-four (N=24) preforms were simultaneously produced by injection molding, subjected to forced cooling, heated, and then subjected to blow molding in units of eight (M=8) preforms. In the comparative example, eight preforms were simultaneously produced by injection molding, heated during intermittent transfer, and then subjected to blow molding in units of four preforms.

In FIG. 10, the time T1 is the forced cooling period using the cooling section 20 according to one embodiment of the invention, the time T2 is the intermittent transfer time using the heating section according to the comparative example, and the time T3 is the continuous transfer time using the heating section 30 according to one embodiment of the invention.

In the comparative example shown in FIG. 10, the temperature of four preforms that are initially subjected to blow molding increases by heating according to the characteristics TC1, and the temperature of four preforms that are subsequently subjected to blow molding increases by heating according to the characteristics TC2. The characteristics TC1 and the characteristics TC2 differ as to the temperature immediately before heating. A relatively large temperature difference Δt is observed between the characteristics TC1 and the characteristics TC2. The temperature difference Δt also occurs during blow molding (see FIG. 10).

In one embodiment of the invention shown in FIG. 10, the temperature of eight preforms that are initially subjected to blow molding increases by heating according to the characteristics TE1, the temperature of eight preforms that are subsequently subjected to blow molding increases by heating according to the characteristics TE2, and the temperature of eight preforms that are subsequently subjected to blow molding increases by heating according to the characteristics TE3. The characteristics TE1, the characteristics TE2, and the characteristics TE3 differ as to the temperature immediately before heating. However, the temperature difference ΔT between the characteristics TE1, the characteristics TE2, and the characteristics TE3 is significantly smaller than the temperature difference Δt in the comparative example. The small temperature difference ΔT also occurs during blow molding (see FIG. 10).

Specifically, when using the 1.5-stage method in which preforms simultaneously produced by injection molding are separately subjected to blow molding in n operations, the temperature of preforms that are initially subjected to blow molding tends to be higher than the temperature of preforms that are subsequently subjected to blow molding. This is because the time from the completion of injection molding to the start of heating is inevitably shorter for the initial heating operation than for the subsequent heating operation. The above tendency significantly occurs when the heating section heats preforms that are initially subjected to blow molding and preforms that are subsequently subjected to blow molding among the preforms simultaneously produced by injection molding while transferring the preforms in a row. Specifically, the heating start time after completion of injection molding differs in units of preforms that are simultaneously subjected to blow molding.

Figure 11:
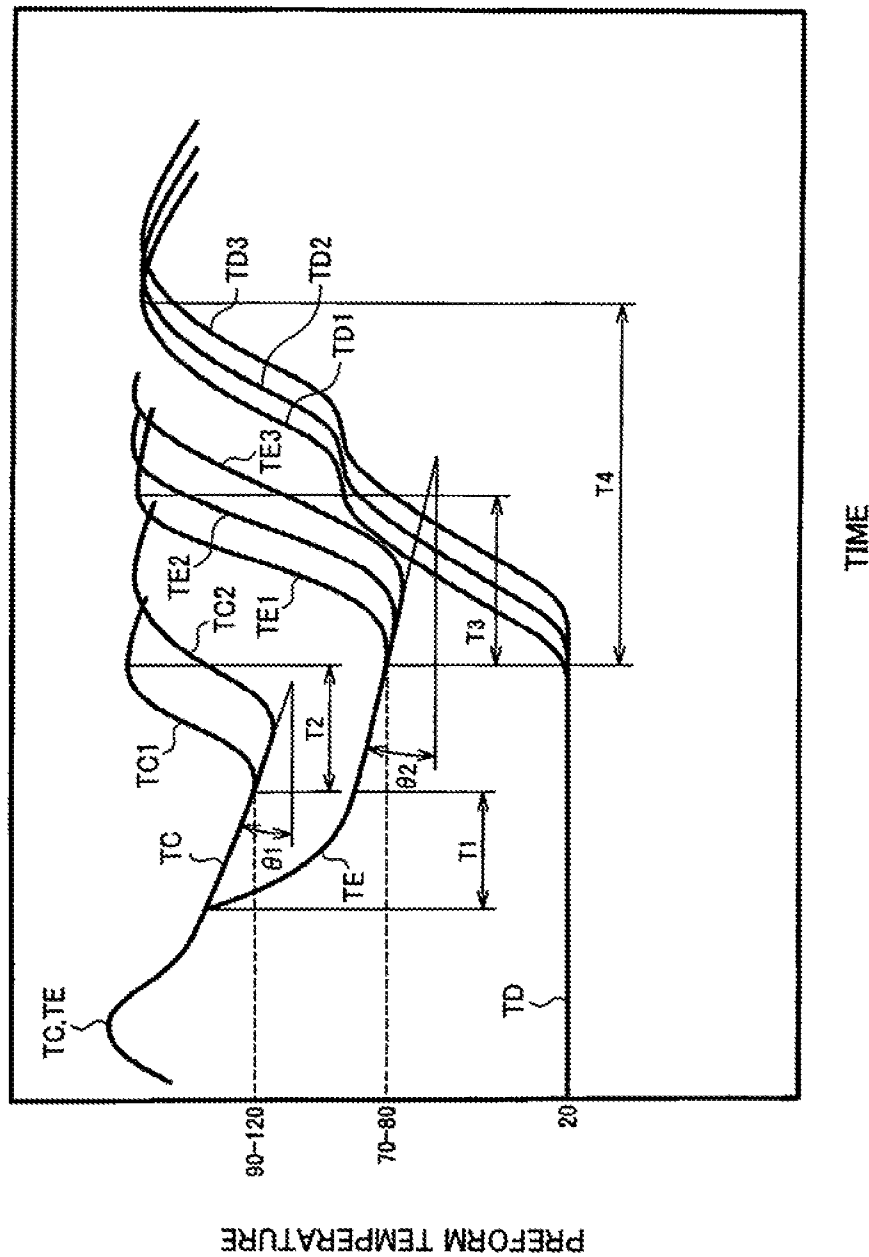
FIG. 11 is a characteristic diagram illustrating a change in preform temperature in one embodiment of the invention and Comparative Examples 1 and 2.
Figure 12:
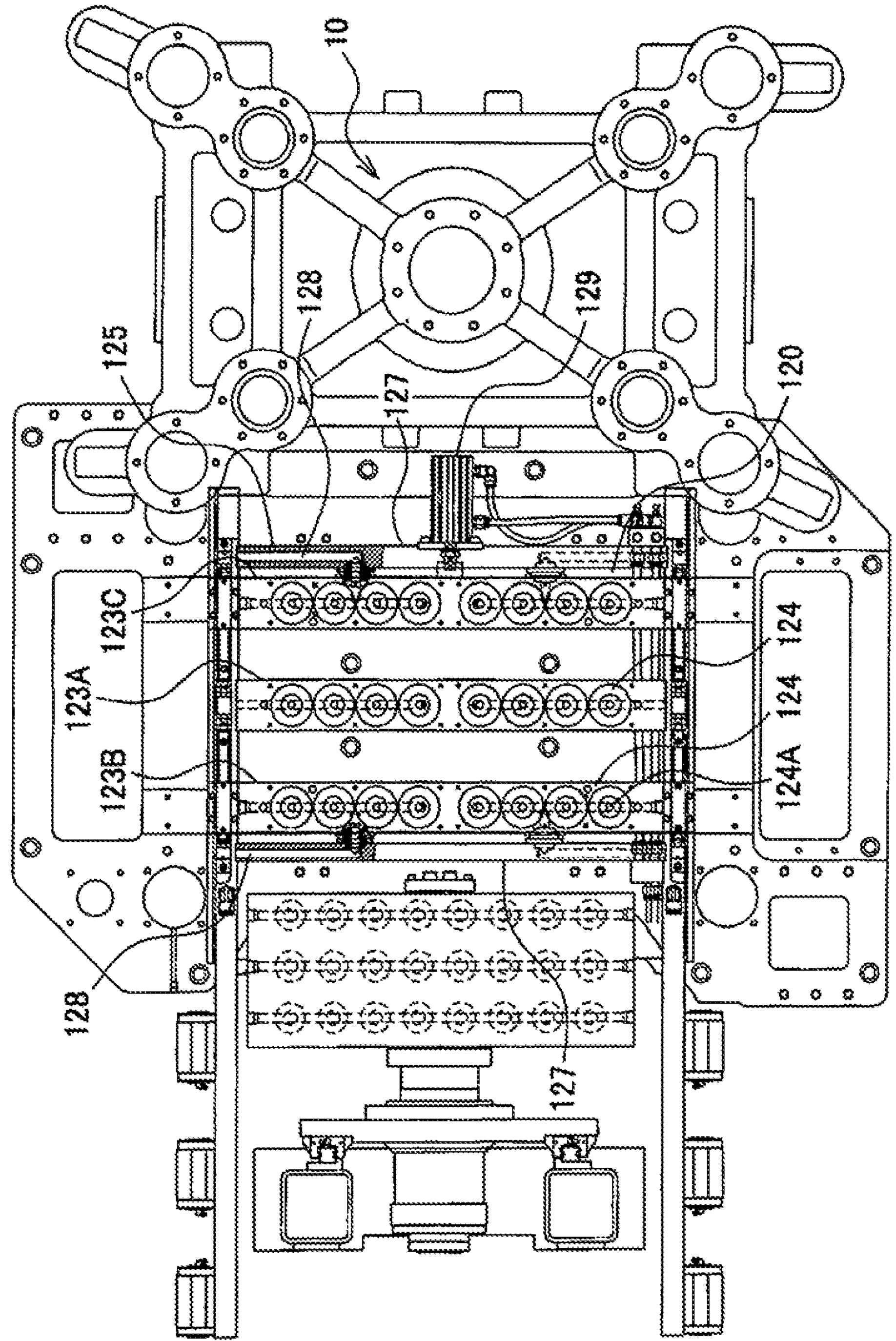
FIG. 12 is a plan view illustrating a modification of a removal device.

FIG. 11 shows the heat history of the preform temperatures TC1 and TC2 achieved by Japanese Patent No. 2954858 (1.5-stage method) (see FIG. 10) (Comparative Example 1), the preform temperatures TD1 to TD3 achieved by the 2-stage method (e.g., U.S. Pat. No. 7,727,454) (Comparative Example 2), and the preform temperatures TE1 to TE3 according to one embodiment of the invention (FIG. 11 shows detailed analysis results for the preform temperature shown in FIG. 10).

In FIG. 11, the preform temperature TC of Comparative Example 1 and the preform temperature TE according to one embodiment of the invention change in an identical manner before the forced cooling period T1 according to one embodiment of the invention starts. As is clear from FIG. 11, the temperature decreases rapidly during the forced cooling period T1 according to one embodiment of the invention. However, the temperature decrease gradient θ2 during natural cooling after the forced cooling period T1 has elapsed is smaller than the temperature decrease gradient θ1 of Comparative Example 1 in which only natural cooling is effected without providing the forced cooling period. This is because the preform temperature TE according to one embodiment of the invention is lower than the preform temperature TC of Comparative Example 1 due to the forced cooling period T1, and the temperature decrease rate decreases as the preform temperature decreases.

In Comparative Example 1, since the preforms are intermittently transferred in the heating section, the preforms that are subjected to blow molding after the preforms that are initially subjected to blow molding are not transferred to the heating section (standby period) at least when the preforms that are initially subjected to blow molding are stopped in the heating section, and the difference in timing at which the preforms are transferred to the heating section increases. Since the preform temperature TC decreases by the relatively large temperature decrease gradient θ1 during the standby period, the difference between the temperature TC1 of the preforms that are initially transferred to the heating section and the temperature TC2 of the preforms that are subsequently transferred to the heating section increases.

According to one embodiment of the invention, the difference in timing at which the preforms are transferred to the heating section is small since continuous transfer is employed. The difference between the temperatures TE1, TE2, and TE3 of the preforms sequentially transferred to the heating section 30 depends on the difference in transfer timing and the temperature decrease gradient θ2. Since the difference in transfer timing and the temperature decrease gradient θ2 are small, the difference between the temperatures TE1, TE2, and TE3 of the preforms is relatively small.

The difference between the temperatures TE1, TE2, and TE3 of the preforms sequentially transferred to the heating section 30 can thus be reduced due to the synergistic effects (i.e., a reduction in temperature decrease gradient and a reduction in difference in timing of transfer to the heating section) of forced cooling in the cooling section 20 and continuous transfer in the heating section 30. Note that the continuous heating period T3 according to one embodiment of the invention is longer than the intermittent heating period T2 of Comparative Example 1 since the heating start temperature is low.

Note that the difference between the temperatures TE1, TE2, and TE3 of the preforms can be reduced as compared with Comparative Example 1 even when implementing only one of forced cooling in the cooling section 20 and continuous transfer in the heating section 30. Therefore, the blow molding quality can be improved as compared with Comparative Example 1 by continuously transferring the preforms in the heating section 30 even if the cooling section 20 is not used, or the preforms are subjected to natural cooling in the cooling section 20 without using the refrigerant.

In Comparative Example 2, since the preforms at room temperature are transferred to the heating section, the difference between the preform temperatures TD1, TD2, and TD3 when the preforms are transferred to the heating section is small as compared with one embodiment of the invention and Comparative Example 1. In Comparative Example 2, however, since the heating period T4 increases to a large extent in order to heat the preforms from room temperature to the optimum blow temperature, energy consumption and the total length of the heating path inevitably increase.

According to one embodiment of the invention, the ill effect of heat that is applied during injection molding and retained by the preforms on the preform temperature during the n blow molding operations can be reduced by subjecting the N preforms transferred from the injection molding section 10 to forced cooling in the cooling section 20. When subjecting the preforms to forced cooling, the difference in temperature between the N preforms before heating decreases as compared with the case where the preforms are not subjected to forced cooling (i.e., subjected to natural cooling). Since it is not necessary to cool the preforms to room temperature by forced cooling, heat that is applied during injection molding and retained by the preforms can be used for blow molding.

The blow molding characteristics have a close relationship with the preform temperature. Specifically, the preform is easily stretched when the preform temperature is high, and is stretched with difficulty when the preform temperature is low. Therefore, a difference in preform temperature occurs when using the 1.5-stage method in which preforms simultaneously produced by injection molding are separately subjected to blow molding. According to one embodiment of the invention, the temperature difference ΔT (see FIG. 10) can be significantly reduced as compared with the temperature difference Δt of the comparative example. This makes it possible to suppress a variation in blow molding quality.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention. Any term cited with a different term having a broader meaning or the same meaning at least once in the specification and the drawings can be replaced by the different term in any place in the specification and the drawings.

7. Modification of Removal Device 120

A configuration that is added to the configuration disclosed in Japanese Patent No. 4148576 as the removal device 120 illustrated in FIGS. 1 and 2 is described below with reference to FIGS. 12 to 14B. The removal device 120 includes two rail main bodies 120A that move between the injection molding section 10 and a position outside the injection molding section 10, and three (i.e., a plurality of) rows of pot support stages 123A to 123C that support the pots 122 on the two rail main bodies 120A so that the pitch can be changed. The center pot support stage 123A is secured on the rail main body 120A, and the pot support stages 123B and 123C provided on either side of the pot support stage 123A can move relative to the rail main body 120A. Each of the pot support stages 123A to 123C has a pot support hole 124, and a suction port 124A is formed in the pot support hole 124.

Figure 13A:
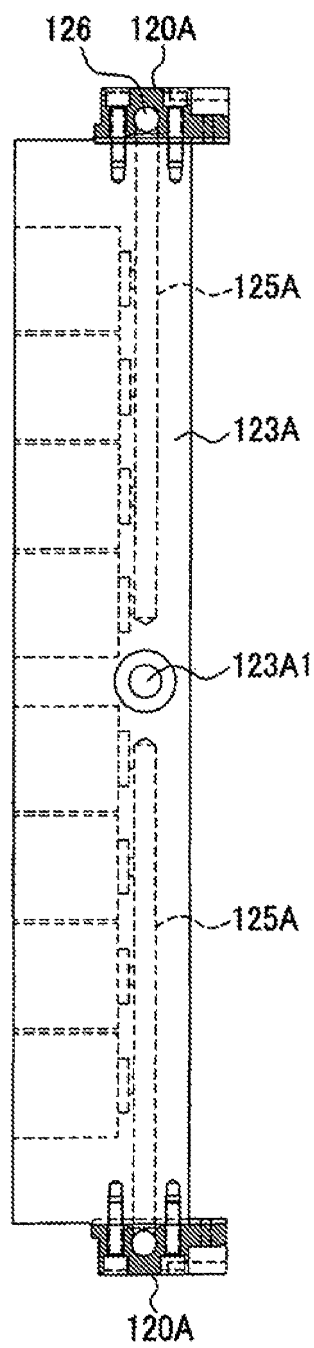
FIGS. 13A and 13B are side views illustrating the fixed pot support stage and the movable pot support stage illustrated in FIG. 12.
Figure 13B:
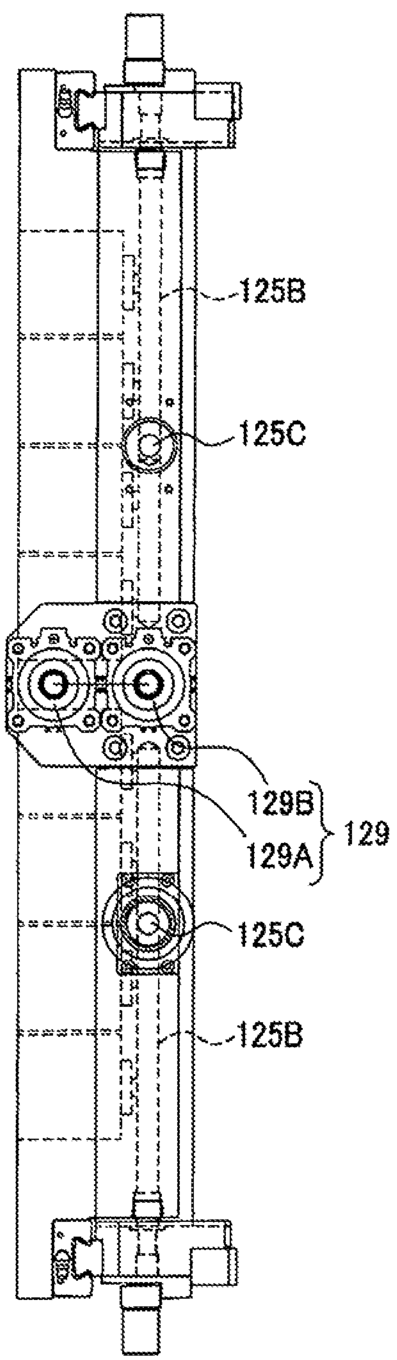

A suction passage 125 (125A, 125B) that communicates with the suction port 124 is provided in the center pot support stage 123A illustrated in FIG. 13A and the pot support stages 123B and 123C illustrated in FIG. 13B that are provided on either side of the pot support stage 123A. As illustrated in FIG. 13A, the suction passage 125A of the fixed pot support stage 123A is open on each end, and always communicates with a suction passage 126 provided in the rail main body 120A. As illustrated in FIG. 13B, the suction passages 125B of the movable pot support stages 123B and 123C are open on a side surface 125C, and communicate with suction passages 128 provided in two connection sections 127 that connect the two rail main bodies 120A.

Two the air cylinders 129A and 129B (pitch change driving section 129) are supported by one of the connection sections 127. The rod of the air cylinder 129A is secured on the movable pot support stage 123B via a hole 123A1 formed in the fixed pot support stage 123A. The rod of the air cylinder 129B is secured on the movable pot support stage 123C.

Figures 14A, 14B:
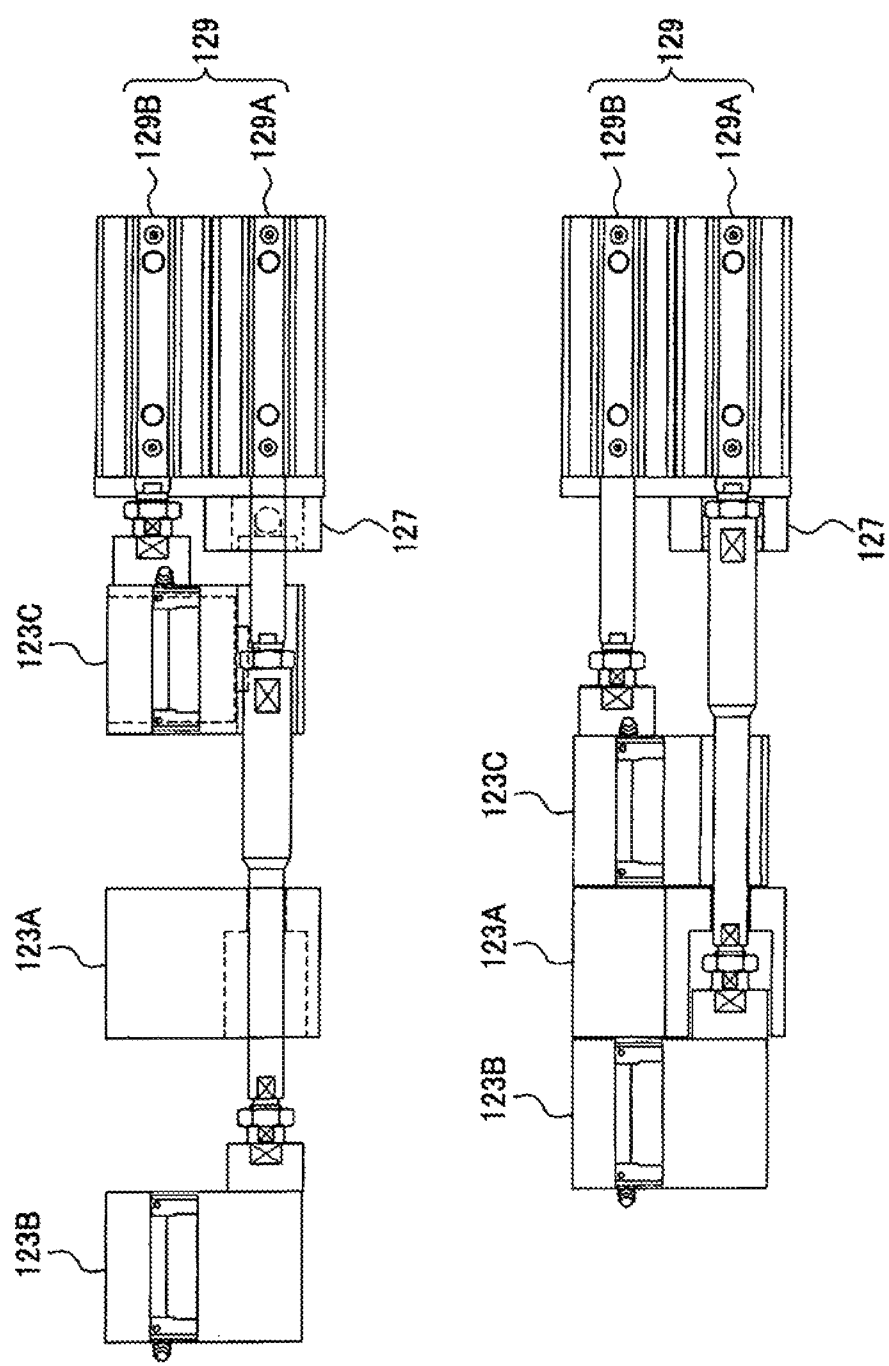
FIGS. 14A and 14B are views illustrating a wide pitch state and a narrow pitch state of the fixed pot support stage and the movable pot support stage illustrated in FIG. 12.

FIG. 14A illustrates a wide pitch state. In this case, the suction passages 125B of the movable pot support stages 123B and 123C communicate with the suction passages 128 provided in the two connection sections 127. The pitch state is set to the wide pitch state when receiving the preforms in the injection molding section 10, and the preforms can be sucked into and supported by the pots 122 (see FIGS. 1 and 2) which are themselves supported by the pot support stages 123A to 123C.

FIG. 14B illustrates a narrow pitch state. In this case, the suction passages 125B of the movable pot support stages 123B and 123C do not communicate with the suction passages 128 provided in the two connection sections 127. The pitch state is set to the narrow pitch state after the removal device 120 has reached the transfer position (see FIG. 2) outside the injection molding section 10, or before the removal device 120 reaches the transfer position. It is necessary to cancel the suction state at the transfer position (see FIG. 2) for transferring the preforms. Since communication with the suction passages 128 is canceled when the pitch state is set to the narrow pitch state, the suction state is automatically canceled. The preforms cannot be sucked when the suction passages 125B of the movable pot support stages 123B and 123C do not communicate with the suction passages 128 provided in the two connection sections 127. Note that it suffices to suck the preforms only when receiving the preforms in the injection molding section 10. The fixed pot support stage 123A tends to remain affected by the suction state for a long time as compared with the movable pot support stages 123B and 123C. Therefore, an air supply circuit may be separately provided to communicate with the fixed pot support stage 123A, and separation of the preforms 2 and the fixed pot support stage 123A may be promoted by supplying air when the pitch state is set to the narrow pitch state.

8. Modification of Preform Transfer Device 50

Figure 3B:
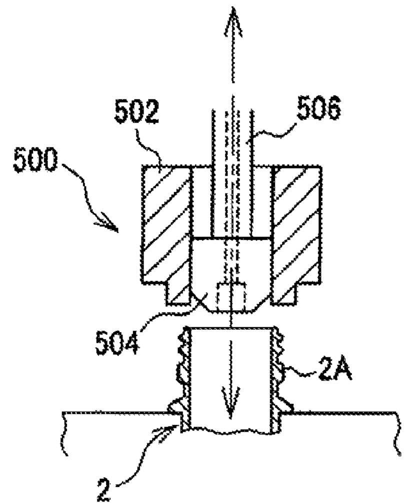
Figure 15A:
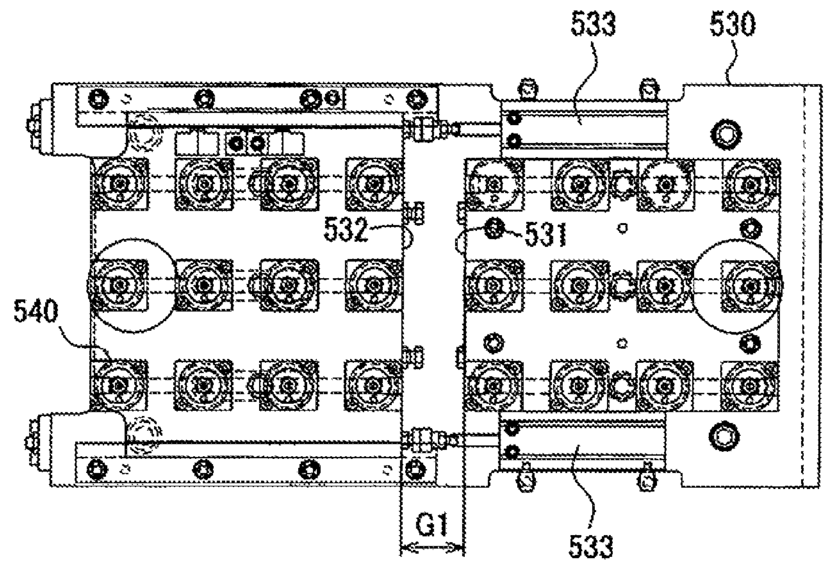
FIGS. 15A and 15B are rear views illustrating a wide gap state and a narrow gap state of a stationary plate and a movable plate in a preform transfer device.
Figure 15B:
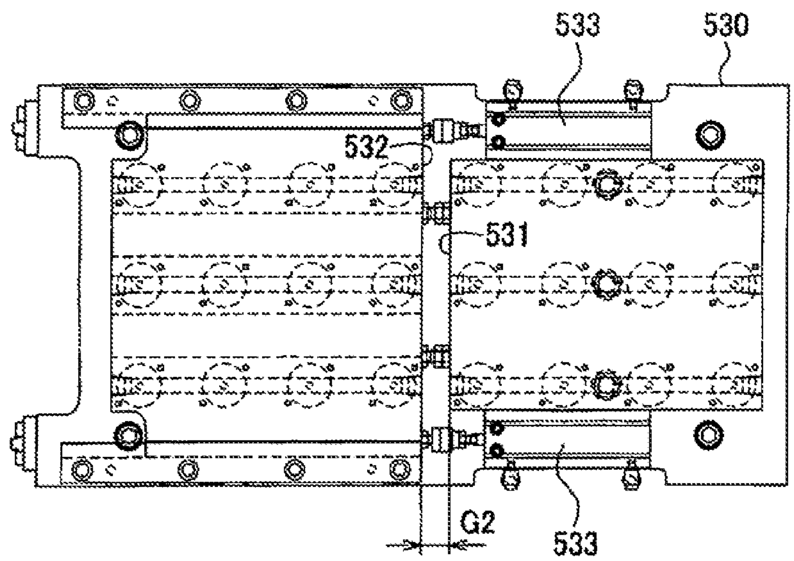

A modification of the preform transfer device 50 illustrated in FIGS. 3A and 3B is described below with reference to FIGS. 15A to 16B. A base board 530 illustrated in FIGS. 15A and 15B is moved vertically and horizontally by the first air cylinder 510 and the second air cylinder 520 illustrated in FIG. 2. A stationary plate 531 and a movable plate 532 are supported by the base board 530. A preform holder 540 illustrated in FIGS. 16A and 16B is supported by the stationary plate 531 and the movable plate 532 instead of the preform holder 500 illustrated in FIGS. 3A and 3B.

The interval between the stationary plate 531 and the movable plate 532 is changed by an air cylinder 533 (gap change driving section) between a wide gap G1 illustrated in FIG. 15A and a narrow gap G2 illustrated in FIG. 15B.

The wide gap G1 illustrated in FIG. 15A is required due to the layout of the resin outlet of the hot runner mold in the injection molding section 10. The arrangement pitch of three (n=3) rows of eight (M=8) preforms supported by the stationary plate 531 and the movable plate 532 is not constant when the wide gap G1 is formed. The interval between the stationary plate 531 and the movable plate 532 is changed from the wide gap G1 illustrated in FIG. 15A to the narrow gap G2 illustrated in FIG. 15B before the preform transfer device 50 transfers the preforms to the cooling section 50 so that the arrangement pitch of three (n=3) rows of eight (M=8) preforms supported by the stationary plate 531 and the movable plate 532 is made constant. Therefore, the preform arrangement pitch can be made constant in the cooling section 20, the heating section 30, and the blow molding section 40. Since the preforms are continuously transferred in the heating section 30, it is important to continuously transfer the preforms at a constant arrangement pitch so that the effect of the adjacent preforms is constant. When the preforms have a large diameter (e.g., M=4), the arrangement pitch may be made constant by increasing the gap.

Figure 16A:
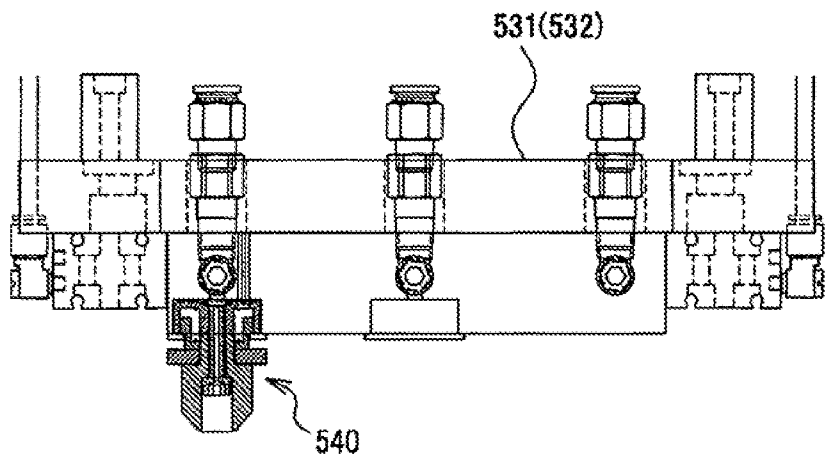
FIGS. 16A and 16B are side views illustrating the preform transfer device illustrated in FIGS. 15A and 15B.
Figure 16B:
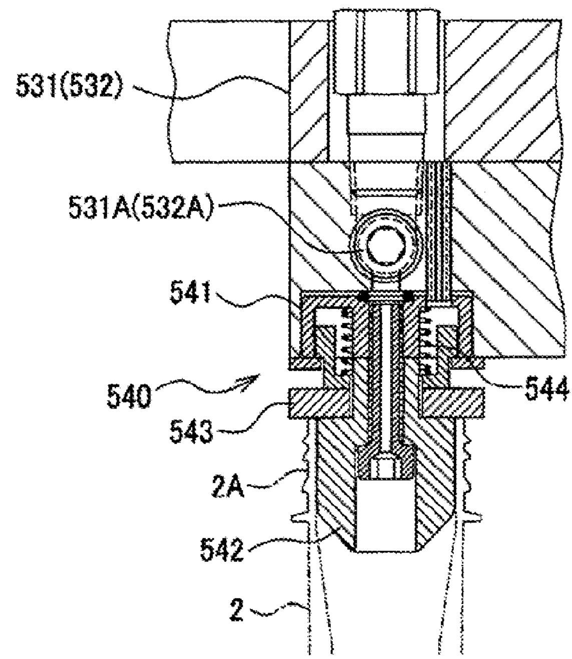
Figure 17:
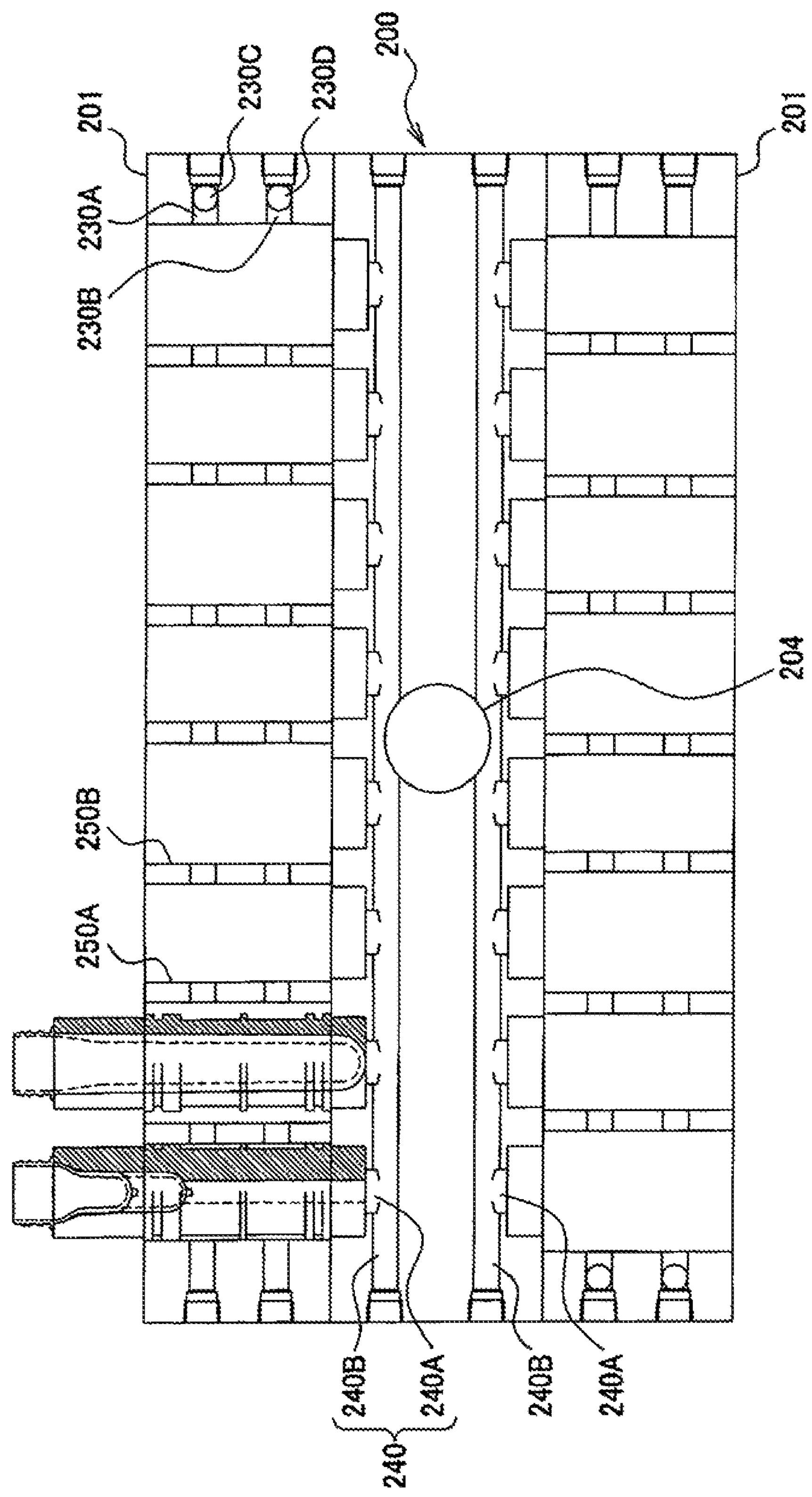
FIG. 17 is a cross-sectional view illustrating a modification of the cooling section illustrated in FIG. 4.

The preform holder 540 illustrated in FIGS. 16A and 16B is supported by the stationary plate 531 and the movable plate 532 illustrated in FIGS. 15A and 15B instead of the preform holder 500 illustrated in FIGS. 3A and 3B. The preform holder 540 includes a holder main body 541, a core 542 that is secured on the holder main body 541, and a top side seal member 543 that is movable relative to the holder main body 541.

A suction passage 531A (532A) is formed in the stationary plate 531 (movable plate 532). The suction passage 531A (532A) communicates with the neck 2A of the preform 2 via the holder main body 541 and the core 542.

The top side seal member 543 is supported so that the top side seal member 543 can move upward and downward relative to the holder main body 541. The top side seal member 543 is always biased downward by a compression coil spring 544 (i.e., biasing member).

The preform holder 540 is disposed over the preform 2 supported by the pot 122 of the removal device 120. When the preform holder 540 is moved downward by the first air cylinder 510 (see FIG. 2), the core 542 is inserted into the neck 2A of the preform 2, and the top side of the neck 2A is sealed by the top side seal member 543. An impact applied upon contact with the top side seal member 543 is reduced, and the top side seal member 543 maintain its top side seal capability due to the compression coil spring 544.

The preform 2 is then sucked toward the preform holder 540, and the preform 2 supported by the pot 122 of the removal device 120 is transferred to the preform holder 540. The suction state is canceled when the preform holder 540 has transferred the preform 2 to the cooling section 20, and the preform 2 is transferred to the cooling pot 220 (see FIG. 4).

9. Modification of Cooling Section

A modification of the cooling section 20 is described below with reference to FIGS. 17 to 20. The cooling section 20 illustrated in FIG. 17 includes the inversion section 200 that rotates around the rotary shaft 204 in the same manner as in FIG. 4. Cooling pots 210A to 210C that cool a preform having a different size (see FIGS. 18A to 18C) can be mounted on the cooling section 20 illustrated in FIG. 17.

Figure 19:
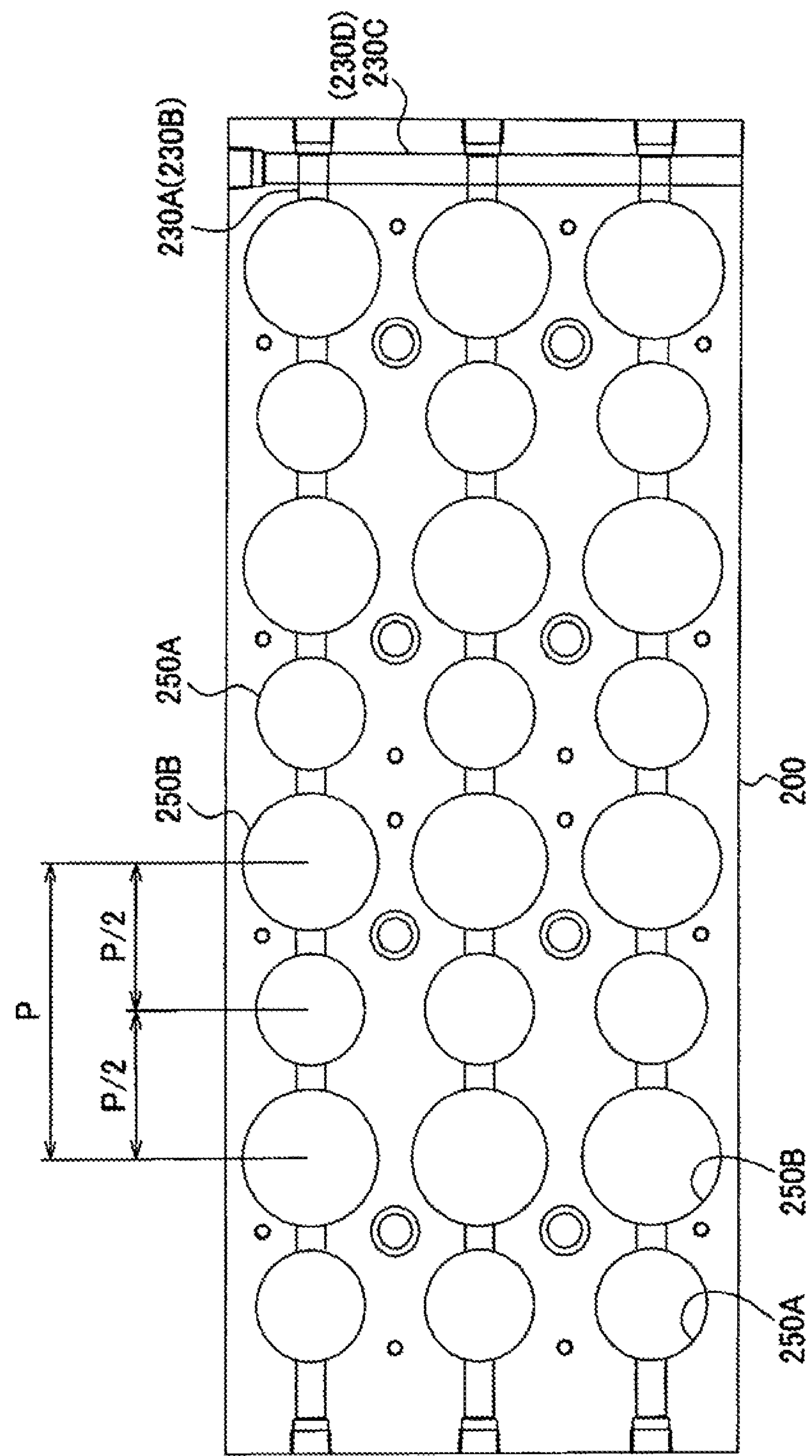
FIG. 19 is a cross-sectional view illustrating the cooling section illustrated in FIG. 17, and illustrates a state in which a cooling pot has been removed.
Figure 20A:
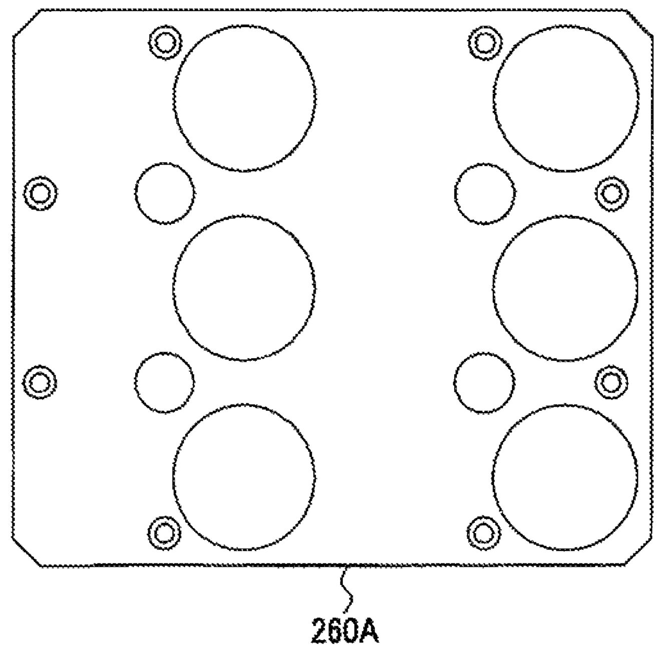
FIGS. 20A and 20B are plan views illustrating a stationary plate on which a cooling pot having a different size is secured.
Figure 20B:
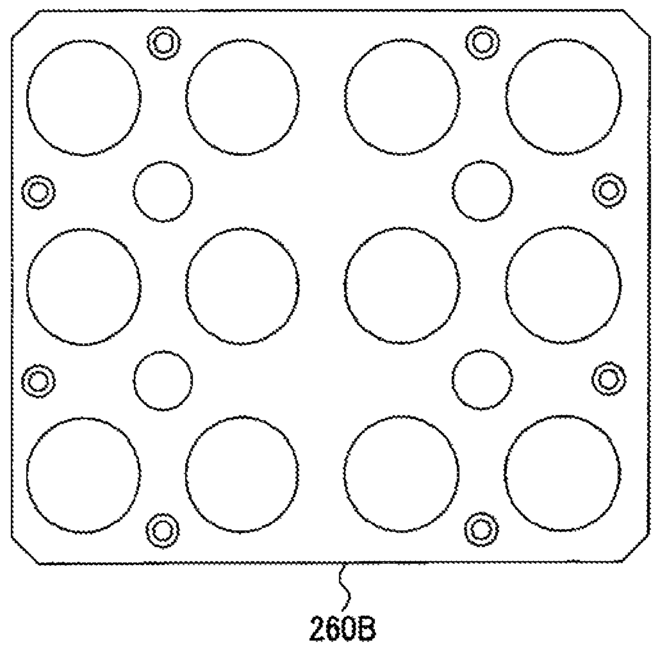

As illustrated in FIG. 19, a small diameter hole 250A and a large diameter hole 250B are formed in the inversion section 200 as the pot insertion holes. Four (M/2=4) large diameter holes 250B are formed in each of three rows (n=3) at a pitch P. Four (M/2=4) small diameter holes 250A and four (M/2=4) large diameter holes 250B are alternately formed in each of the three rows (n=3). The arrangement pitch between the small diameter hole 250A and the large diameter hole 250B is P/2.

Figures 18A, 18B, 18C:
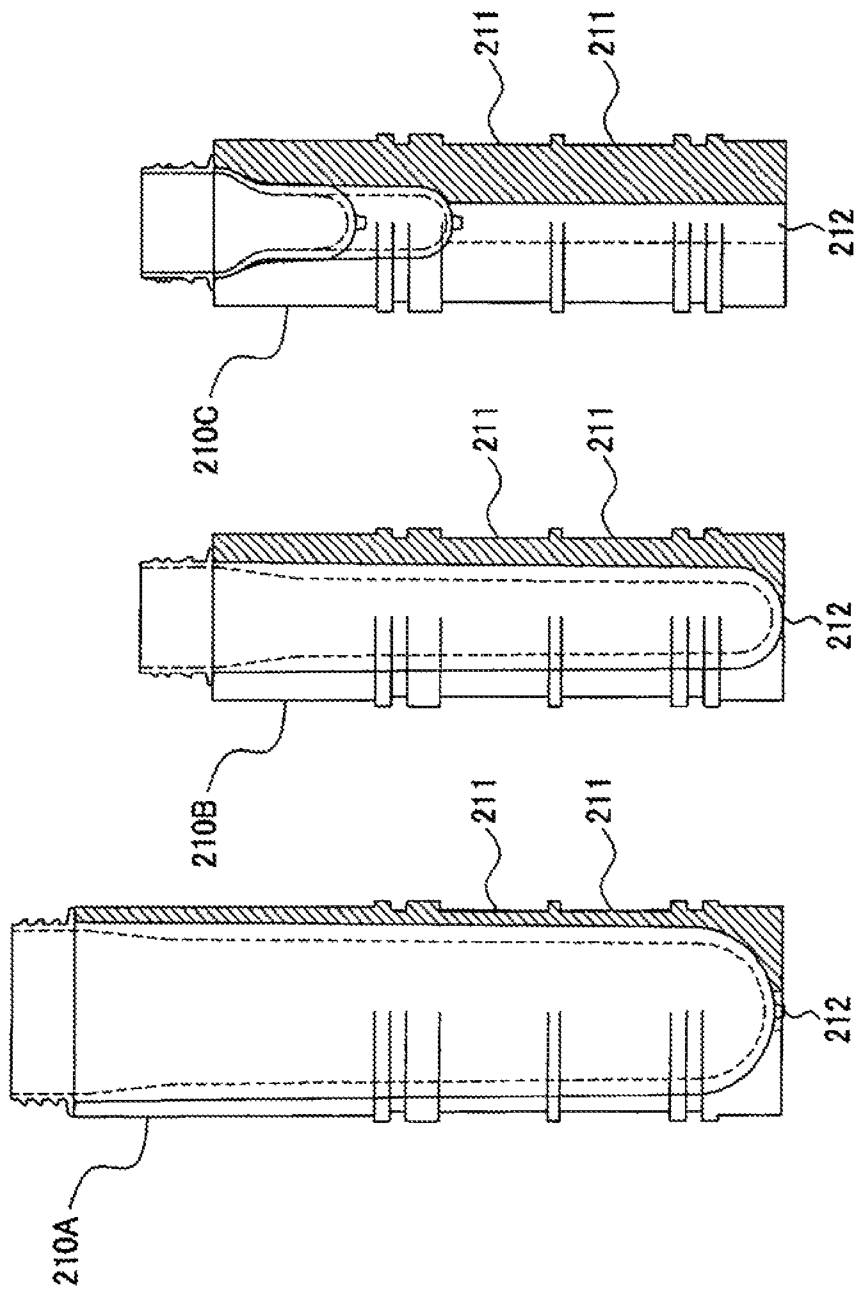
FIGS. 18A to 18C are views illustrating cooling pots that receive a preform having a different size.

When producing the preform 2 having a large diameter illustrated in FIG. 18A, the number of preforms simultaneously produced by injection molding in the injection molding section 10 is reduced to N/2. In this case, N/2 cooling pots 210A can be disposed on the first side 201 and the second side 202 by disposing the cooling pot 210A illustrated in FIG. 18B in M/2 large diameter holes (n rows) formed in the inversion section 200.

Since it is possible to simultaneously produce N preforms having a small diameter (see FIG. 18B or 18C), N cooling pots 210B or 210C can be disposed on the first side 201 and the second side 202 using M/2 small diameter holes 250A and M/2 large diameter holes 250B. When a cooling pot having an identical size is used for a preform having a small diameter, a space formed when inserting the cooling pot 210B or 210C (see FIG. 18B or 18C) into the large diameter hole 250B may be filled with a lining material or the like.

Note that the cooling pot 210A inserted into the large diameter hole 250B of the inversion section 200 is secured on the inversion section 200 using a pot securing plate 260A (see FIG. 20A), and the small diameter hole 250A is closed. Note that the cooling pot 210B or 210C inserted into the small diameter hole 250A of the inversion section 200 is secured on the inversion section 200 using a pot securing plate 260B (see FIG. 20B), and the large diameter hole 250B is closed.

As illustrated in FIGS. 18A to 18C, a recess 211 is formed in the outer wall of the cooling pots 210A to 210C. In FIGS. 18A to 18C, two recesses 11 are formed in the outer wall of the cooling pots 210A to 210C in the circumferential direction. Note that only one recess 211 may be formed.

The inversion section 200 includes refrigerant (e.g., cold water) flow passages 230A to 230D. The flow passages 230A and 230B that extend in the horizontal direction communicate with the two recesses 11 of the cooling pots 210A to 210C to circulate the refrigerant. The recess 11 thus forms part of the refrigerant flow passage.

The cooling efficiency can be improved by bringing the refrigerant into direct contact with the outer wall of the cooling pots 210A to 210C over a wide area. The cooling pots 210A to 210C are selectively used depending on the size of the preform. The inversion section 200 in which the flow passages 230A to 230D are formed can be used in common by merely forming the recess 211 in the outer wall of the cooling pots 210A to 210C.

10. Inversion Transfer Device on Downstream Side of Heating Section 30

An inversion transfer mechanism 70 that transfers the preform 2 in the inversion direction F illustrated in FIG. 2 or the inversion direction I6 illustrated in FIG. 9, and the upward direction D illustrated in FIG. 2, and transfers the preform 2 to the intermission transfer mechanism 400 illustrated in FIG. 1 is described below with reference to FIGS. 21 to 23.

Figure 21:
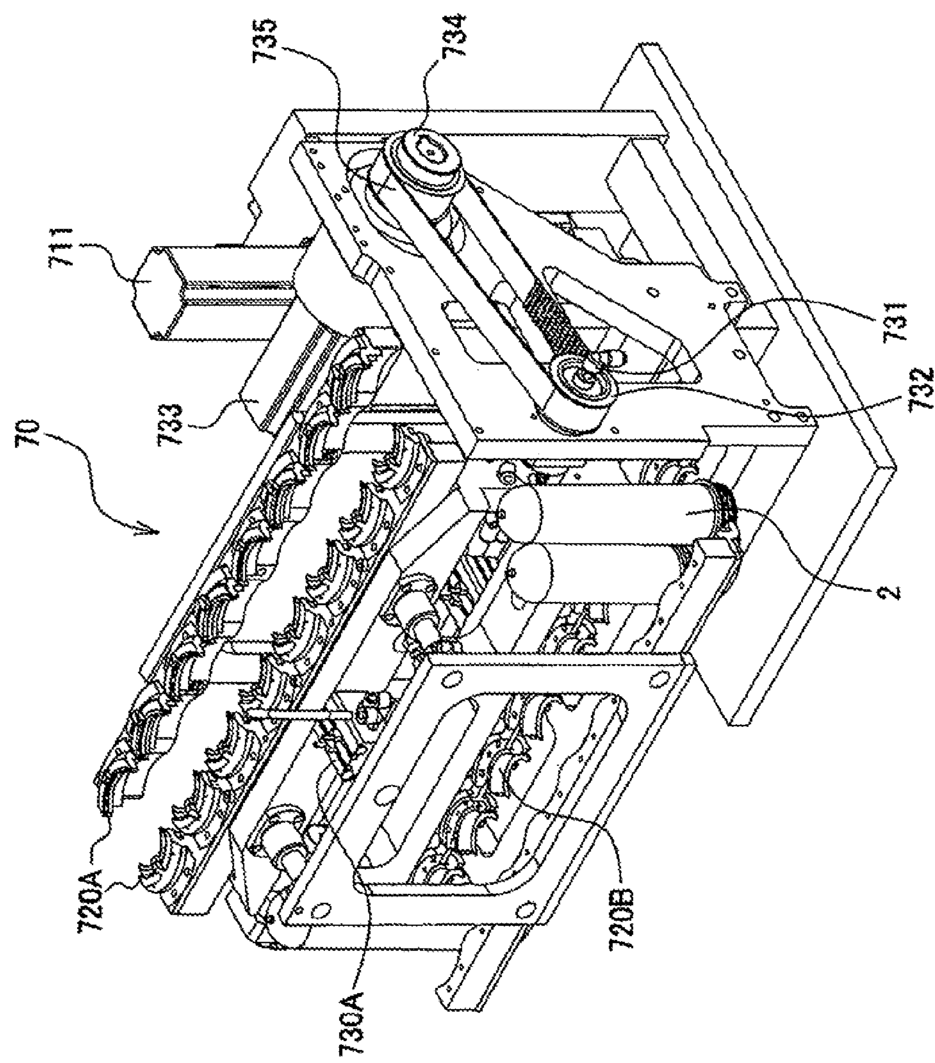
FIG. 21 is a schematic oblique view illustrating an inversion transfer mechanism.
Figure 22:
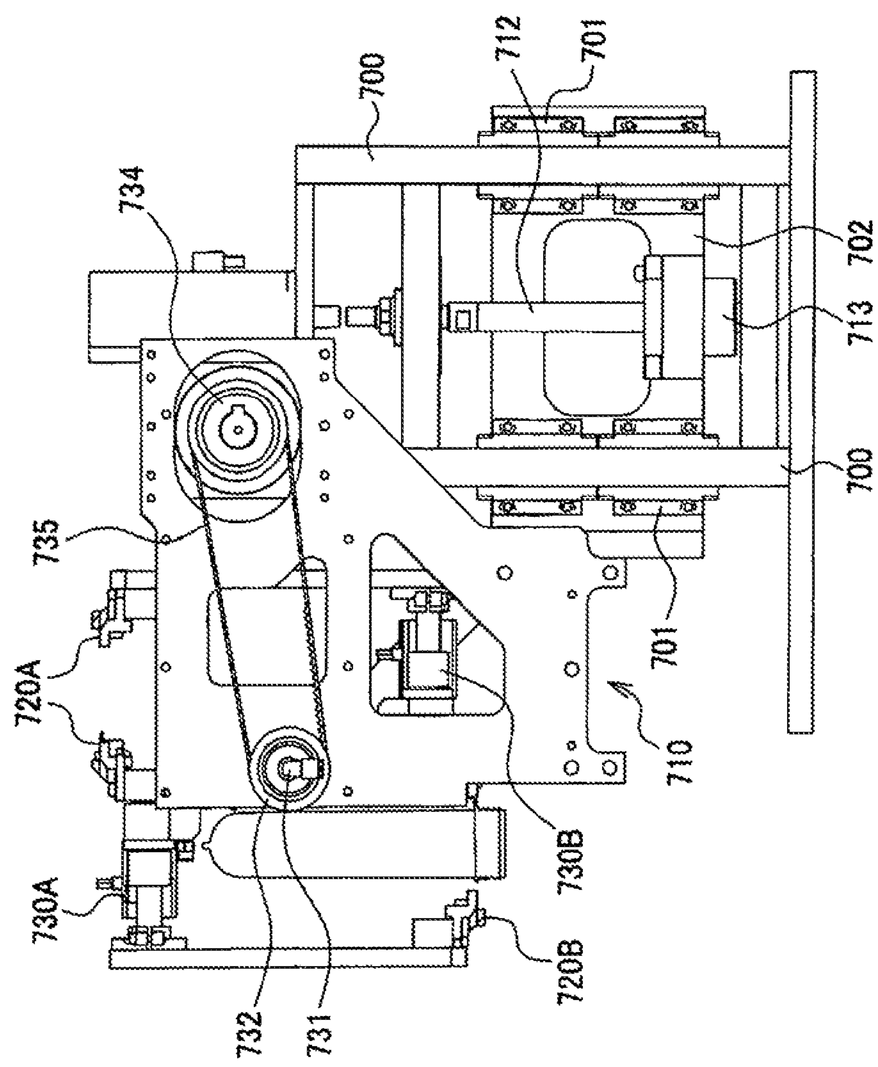
FIG. 22 is a front view illustrating an inversion transfer mechanism.
Figure 23:
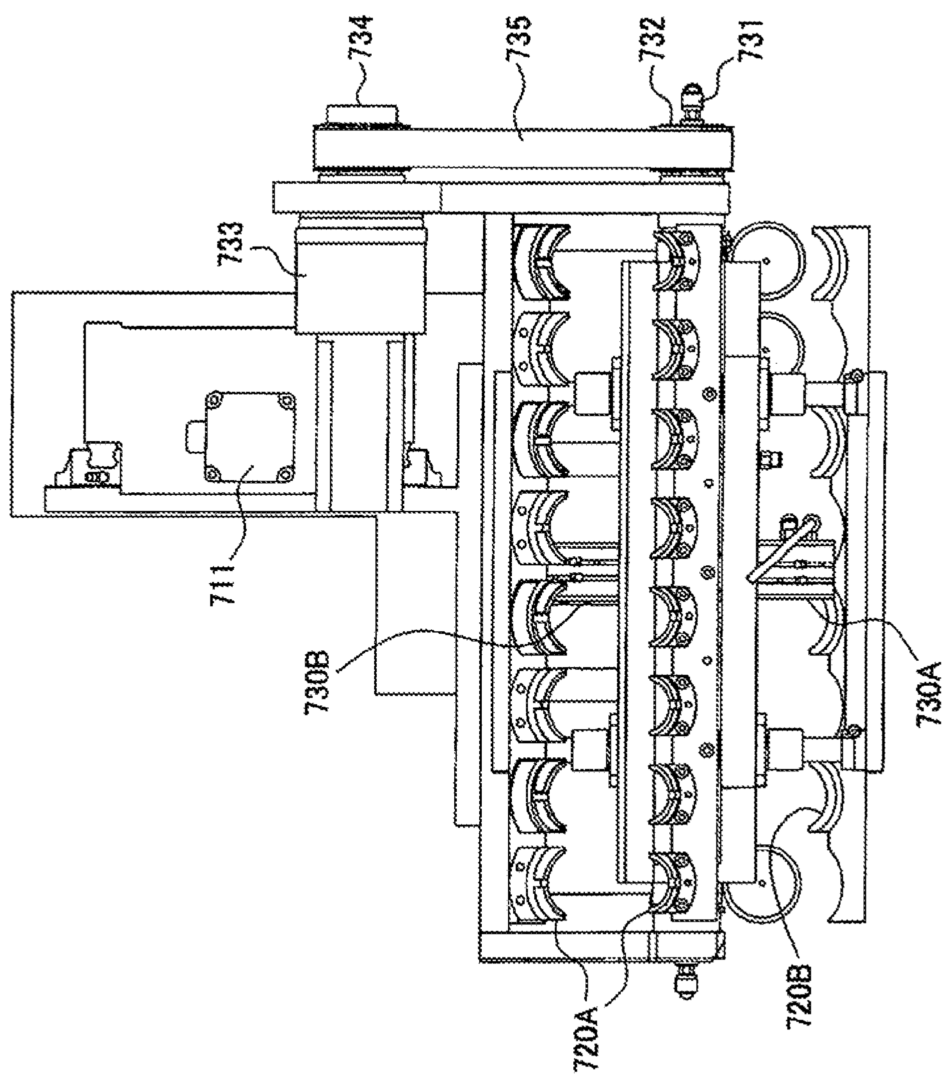
FIG. 23 is a plan view illustrating an inversion transfer mechanism.

As illustrated in FIGS. 21 to 23, the inversion transfer mechanism 70 includes an elevating section 710 that moves together with an elevating plate 702 that moves upward and downward along a guide shaft 700 via a linear bearing 701. The elevating plate 702 includes a nut section 713 that engages a ball screw 712 that is driven by a servomotor 711 (i.e., elevating driving section).

The elevating section 710 supports M pairs of chucks 720A and M pairs of chucks 720B so that the M pairs of chucks 720A and the M pairs of chucks 720B can be simultaneously opened and closed by upper and lower air cylinders 730A and 730B (i.e., opening/closing driving sections) (see FIG. 22). The air cylinder 730A illustrated in FIG. 22 opens and closes the chucks 720A and 720B positioned on the left side in FIG. 22, and the air cylinder 730B illustrated in FIG. 22 opens and closes the chucks 720A and 720B positioned on the right side in FIG. 22 (only the chuck 720B is illustrated in FIG. 22).

The M pairs of chucks 720A and the M pairs of chucks 720B are rotated around a rotary shaft 731 together with the rotary shaft 731. A slotted pulley 732 is secured on the rotary shaft 731. A timing belt 735 is fitted around a slotted pulley 734 that is rotated by a servomotor 733 (i.e., rotation driving section) and a slotted pulley 732 that is secured on the rotary shaft 731.

When the elevating section 710 is situated at a lower position, the M pairs of chucks 720B are closed to hold M preforms in the inverted state that have been heated by the heating section 30. The elevating section 710 is then moved upward, and the M pairs of chucks 720A and the M pairs of chucks 720B are rotated around the rotary shaft 731. Therefore, the M pairs of chucks 720B are positioned on the upper side, and the preforms 2 inverted from the inverted state to the upright state (see the arrow indicated by F in FIG. 2).

11. Blow Molding Section and Intermittent Transfer Mechanism

Figure 24:
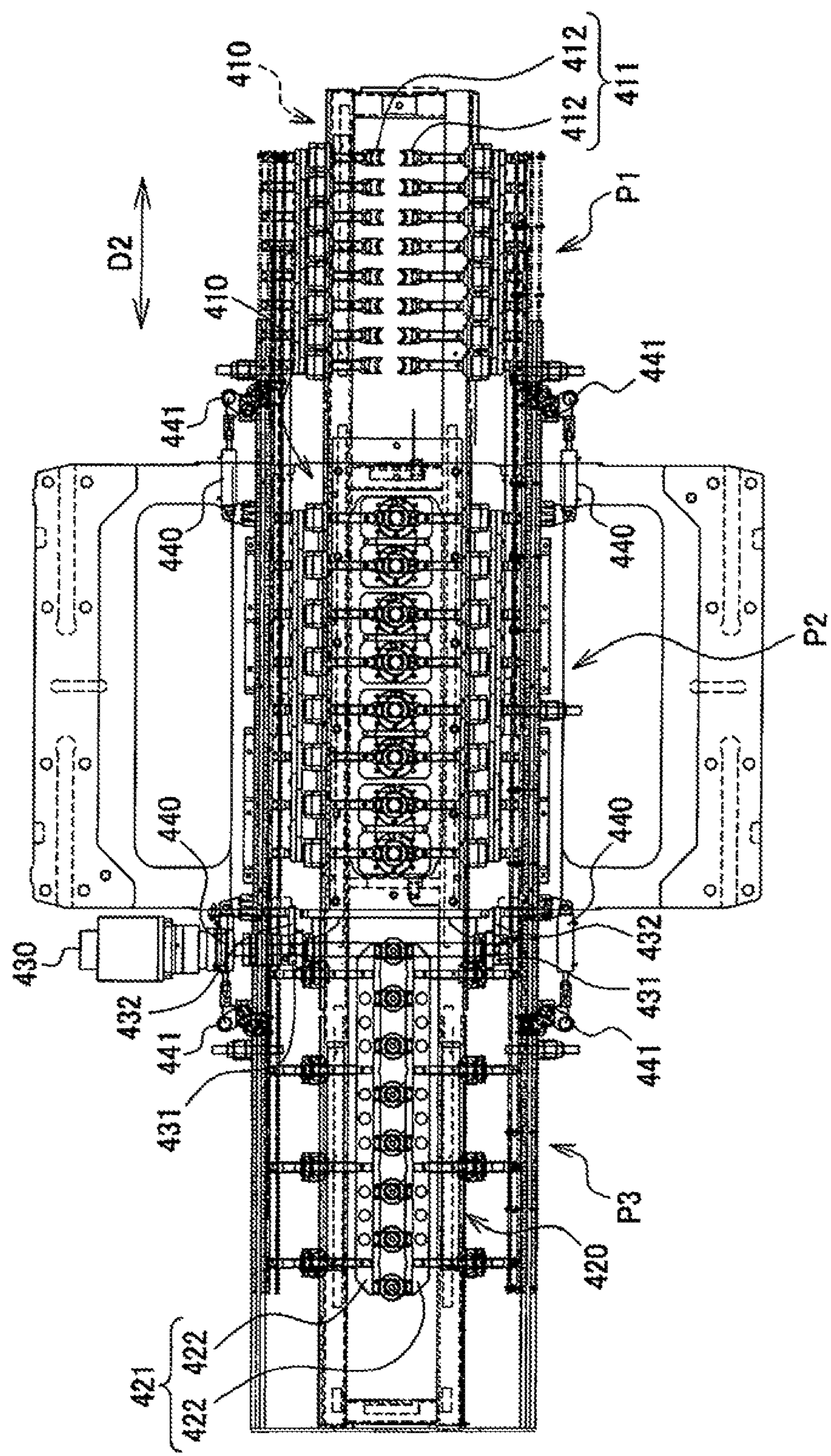
FIG. 24 is a view illustrating a specific example of a blow molding section and an intermittent transfer mechanism.
Figure 25:
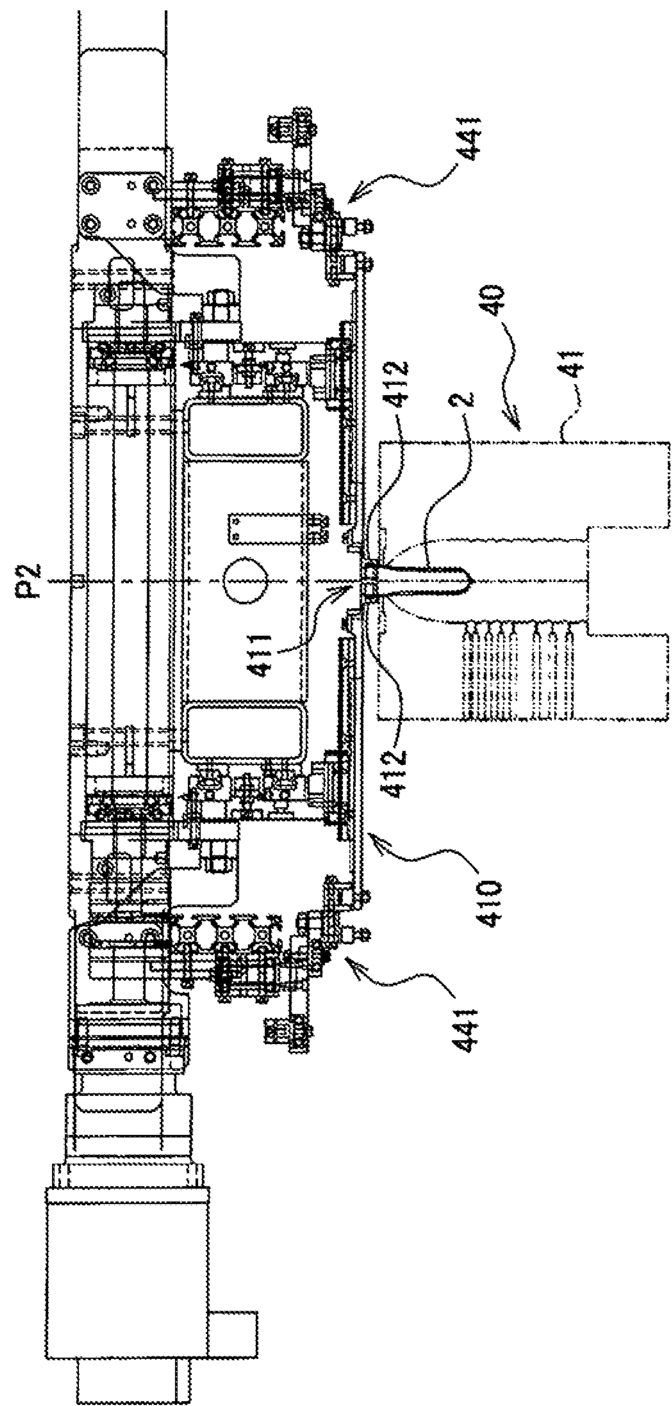
FIG. 25 is a view illustrating a blow molding section.

FIG. 24 illustrates a specific example of the blow molding section 40 and the intermittent transfer mechanism 400. FIG. 25 is a front view illustrating the blow molding section 40. The intermittent transfer mechanism 400 is configured so that a carry-in section 410 and a carry-out section 420 are integrally reciprocated in the second direction D2 in FIG. 24. The carry-in section 410 and the carry-out section 420 are reciprocated using two pinion gears 431 that are secured on the rotary shaft of a servomotor 430 (i.e., reciprocation driving section), and two racks 432 that engages the pinion gears 431 and are driven linearly (partially illustrated in FIG. 24). The carry-in section 410 and the carry-out section 420 are reciprocated integrally with the racks 432. The carry-in section 410 is reciprocated between a preform-receiving position P1 and a blow molding position P2, and the carry-out section 420 is reciprocated between the blow molding position P2 and an ejection position P3. Note that the carry-in section 410 is stopped at the preform-receiving position P1 or the blow molding position P2.

The carry-in section 410 includes M transfer members 411 that transfer M preforms. Each of the M transfer members 411 includes a pair of chucks 412. The carry-out section 420 includes a transfer member 421 that includes a pair of chucks 422 that transfer M containers. The chucks 412 and 422 are integrally opened and closed by transmitting a driving force of four (i.e., a plurality of) air cylinders 440 (opening/closing driving sections) via a link mechanism 441 (see FIG. 24).

As illustrated in FIG. 25, M preforms 2 are transferred by the M transfer members 411 of the carry-in section 410 to the blow molding position P2 of the blow molding section 40 in the direction perpendicular to the sheet. A blow cavity mold 41 has been opened. The blow cavity mold 41, a blow core mold (not illustrated in FIG. 24), and an optional bottom mold are then clamped. The M preforms 2 are thus transferred to the blow molding section 40. The chucks 412 of the M transfer members 411 are opened, and moved from the blow molding position P2 to the preform-receiving position P1 (see FIG. 24). The carry-out section 420 is moved from the ejection position P3 to the blow molding position P2, and held at the blow molding position P2 in a state in which the chucks 422 are opened.

When M containers have been molded from the M preforms 2 in the blow molding section 40, the chucks 422 of the carry-out section 420 are closed to hold the neck of each container. The chucks 412 of the carry-in section 410 are closed at the preform-receiving position P1 to hold M preforms 2. The carry-out section 420 transfers the M containers from the blow molding position P2 to the ejection position P3, and the carry-in section 410 moves the M preforms 2 from the preform-receiving position P1 to the blow molding position P2. The blow molding section 40 continuously implements the blow molding operation by repeating the above operation.

An operation that transfers the preform 2 from the inversion transfer mechanism 70 illustrated in FIGS. 21 to 23 to the carry-in section 410 of the intermittent transfer mechanism 400 illustrated in FIG. 24 is described below with reference to FIGS. 26 and 27.

Figure 26:
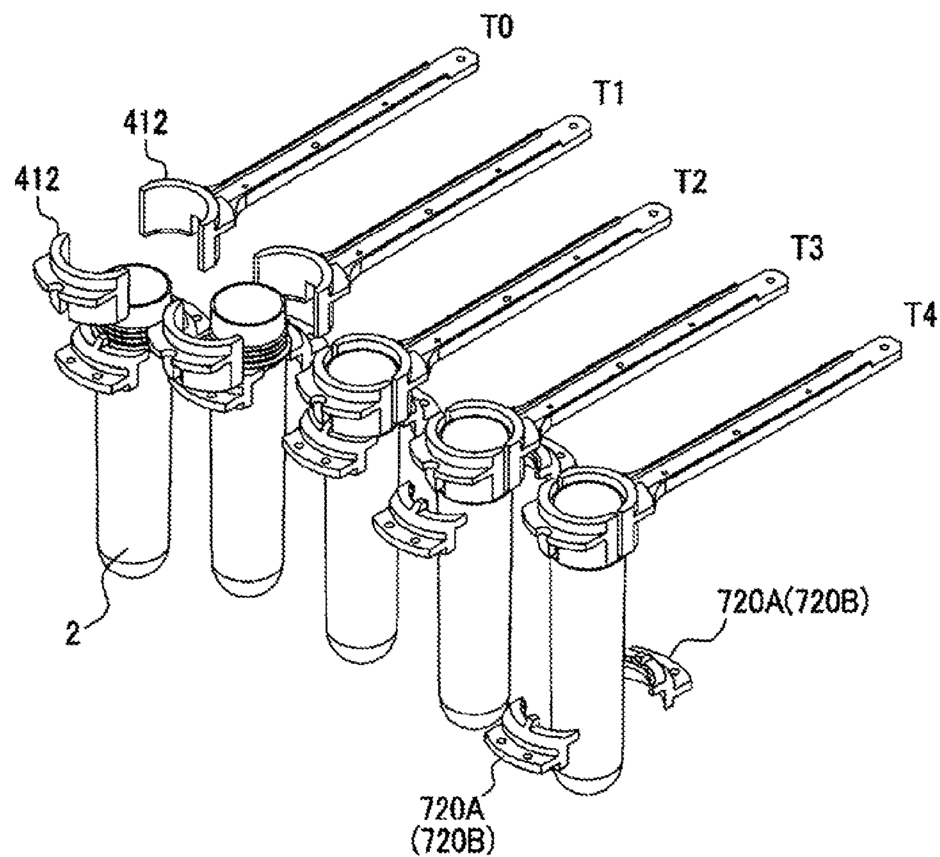
FIG. 26 is a perspective view illustrating transfer from an inversion transfer mechanism to an intermittent transfer mechanism.
Figure 27:
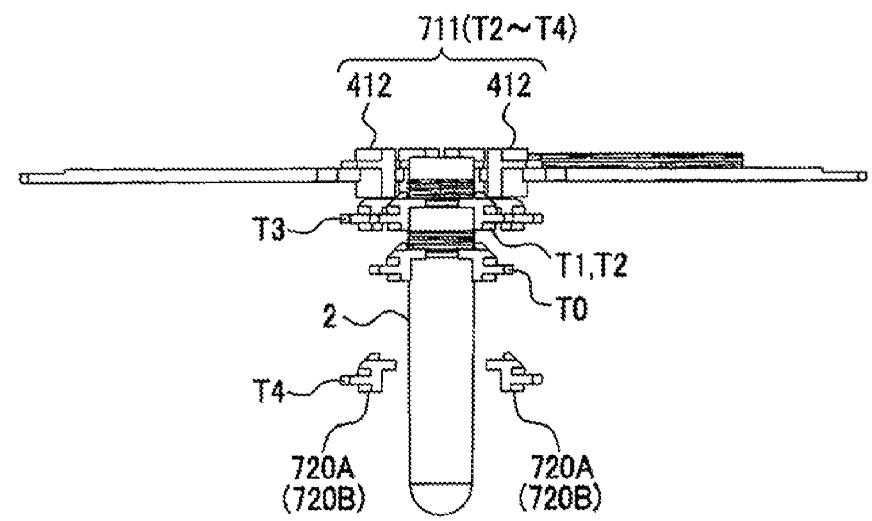
FIG. 27 is a front view illustrating transfer from an inversion transfer mechanism to an intermittent transfer mechanism.

T0 to T4 illustrated in FIGS. 26 and 27 are timings that change on the time axis. FIGS. 26 and 27 illustrate the operations of a pair of chucks 720A (hereinafter referred to as "a pair of first chucks") and a pair of chucks 412 (hereinafter referred to as "a pair of second chucks") on the time axis (from T0 to T4). These operations are performed at the preform transfer position P1 illustrated in FIG. 24.

At the timing T0, the preform 2 held by the pair of first chucks 720A stands by under the pair of second chucks 412 in an open state. At the timing T1, the preform 2 held by the pair of first chucks 720A is moved upward, and the neck is disposed between the pair of second chucks 412 in an open state.

At the timing T2, the pair of second chucks 412 in an open state is closed. Therefore, the neck of the preform 2 is held by the pair of first chucks 720A and the pair of second chucks 412 at the timing T2.

At the timing T3, the pair of first chucks 720A is moved downward. The preform 2 is thus transferred from the pair of first chucks 720A to the pair of second chucks 412.

The pair of second chucks 412 is then transferred from the preform-receiving position P1 to the blow molding position P2. The pair of first chucks 720A is then moved downward, and rotated by the servomotor 733 (see FIG. 21), and the first chucks 720B that hold M preforms 2 are set to the position at the timing T0 in FIGS. 26 and 27. The pair of second chucks 412 is returned from the blow molding position P1 to the preform transfer position P1, and set to the position at the timing T0 in FIGS. 26 and 27. The above preform transfer operation is repeated.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A molded article transferring device comprising:

a transfer path that transfers a plurality of molded articles; and a heating section that is provided along the transfer path, wherein the transfer path includes a plurality of sprockets, a plurality of transfer members that respectively hold one molded article, two transfer members among the plurality of transfer members that are adjacent to each other in a transfer direction coming in contact with each other, and a guide rail that guides the plurality of transfer members along the transfer direction to engage the plurality of sprockets, wherein each of the plurality of transfer members includes a chain, at least one transfer member among the plurality of transfer members is driven to move along the transfer direction by causing the chain provided on the at least one transfer member to engage with at least one sprocket among the plurality of sprockets, and wherein the at least one transfer member presses other transfer members positioned on an upstream side of the transfer path.

2. The molded article transferring device as defined in claim 1, wherein some sprockets among the plurality of sprockets that are adjacent to each other in the transfer direction are continuously driven, and wherein other sprockets among the plurality of sprockets that are adjacent to each other in the transfer direction are intermittently driven at a high speed as compared with the some sprockets.

3. A molded article transferring device comprising:

a transfer path that transfers a plurality of molded articles; and a heating section that is provided along the transfer path, wherein the transfer path includes a plurality of sprockets, a plurality of transfer jigs, two transfer jigs among the plurality of transfer jigs that are adjacent to each other in a transfer direction coming in contact with each other, and a guide rail that guides the plurality of transfer jigs along the transfer direction to engage the plurality of sprockets, wherein each of the plurality of transfer jigs includes:

a plurality of transfer members that respectively hold one molded article; and a connection member that connects the plurality of transfer members so that the plurality of transfer members integrally move in the transfer direction, wherein each of the plurality of transfer jigs includes a chain, at least one transfer jig among the plurality of transfer jigs is driven to move along the transfer direction by causing the chain provided on the at least one transfer jig to engage with at least one sprocket among the plurality of sprockets, and wherein the at least one transfer jig presses other transfer jigs positioned on an upstream side of the transfer path.

4. The molded article transferring device as defined in claim 3, wherein some sprockets among the plurality of sprockets that are adjacent to each other in the transfer direction are continuously driven, and wherein other sprockets among the plurality of sprockets that are adjacent to each other in the transfer direction are intermittently driven at a high speed as compared with the some sprockets.

5. A blow molding device comprising:

an injection molding section that injection molds preforms;

a blow molding section that blow molds the preforms into containers; and a molded article transferring device comprising a transfer path that transfers a plurality of molded articles; and a heating section that is provided along the transfer path, wherein the transfer path includes a plurality of sprockets, a plurality of transfer members that respectively hold one molded article, two transfer members among the plurality of transfer members that are adjacent to each other in a transfer direction coming in contact with each other, and a guide rail that guides the plurality of transfer members along the transfer direction to engage the plurality of sprockets, wherein each of the plurality of transfer members includes a chain, at least one transfer member among the plurality of transfer members is driven to move along the transfer direction by causing the chain provided on the at least one transfer member to engage with at least one sprocket among the plurality of sprockets, and wherein the at least one transfer member presses other transfer members positioned on an upstream side of the transfer path.

6. The blow molding device of claim 5, wherein some sprockets among the plurality of sprockets that are adjacent to each other in the transfer direction are continuously driven, and wherein other sprockets among the plurality of sprockets that are adjacent to each other in the transfer direction are intermittently driven at a high speed as compared with the some sprockets.

7. A blow molding device comprising:

an injection molding section that injection molds preforms;

a blow molding section that blow molds the preforms into containers; and a molded article transferring device comprising a transfer path that transfers a plurality of molded articles; and a heating section that is provided along the transfer path, wherein the transfer path includes a plurality of sprockets, a plurality of transfer jigs, two transfer jigs among the plurality of transfer jigs that are adjacent to each other in a transfer direction coming in contact with each other, and a guide rail that guides the plurality of transfer jigs along the transfer direction to engage the plurality of sprockets, wherein each of the plurality of transfer jigs includes:

a plurality of transfer members that respectively hold one molded article; and a connection member that connects the plurality of transfer members so that the plurality of transfer members integrally move in the transfer direction, wherein each of the plurality of transfer jigs includes a chain, at least one transfer jig among the plurality of transfer jigs is driven to move along the transfer direction by causing the chain provided on the at least one transfer jig to engage with at least one sprocket among the plurality of sprockets, and wherein the at least one transfer jig presses other transfer jigs positioned on an upstream side of the transfer path.

8. The blow molding device of claim 7, wherein some sprockets among the plurality of sprockets that are adjacent to each other in the transfer direction are continuously driven, and wherein other sprockets among the plurality of sprockets that are adjacent to each other in the transfer direction are intermittently driven at a high speed as compared with the some sprockets.

* * * * *